United States Patent
Ohno et al.

(10) Patent No.: US 10,035,434 B2
(45) Date of Patent: Jul. 31, 2018

(54) VEHICLE SEAT

(71) Applicant: TOYOTA JIDOSHA KABUSHIKI KAISHA, Toyota-shi (JP)

(72) Inventors: Mitsuyoshi Ohno, Miyoshi (JP); Osamu Fukawatase, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/228,835

(22) Filed: Aug. 4, 2016

(65) Prior Publication Data

US 2017/0036565 A1 Feb. 9, 2017

(30) Foreign Application Priority Data

Aug. 4, 2015 (JP) .................. 2015-154388

(51) Int. Cl.
| | |
|---|---|
| B60N 2/02 | (2006.01) |
| B60N 2/06 | (2006.01) |
| B60N 2/22 | (2006.01) |
| B60N 2/42 | (2006.01) |
| B60N 2/427 | (2006.01) |
| B60R 21/015 | (2006.01) |
| B60R 21/207 | (2006.01) |

(Continued)

(52) U.S. Cl.
CPC ......... *B60N 2/0276* (2013.01); *B60N 2/0232* (2013.01); *B60N 2/06* (2013.01); *B60N 2/22* (2013.01); *B60N 2/4214* (2013.01); *B60N 2/4279* (2013.01); *B60N 2/42736* (2013.01); *B60R 21/015* (2013.01); *B60R 21/207* (2013.01); *B60N 2002/022* (2013.01); *B60N 2002/0268* (2013.01); *B60R 2021/01252* (2013.01); *B60R 2021/161* (2013.01)

(58) Field of Classification Search
CPC .................................................... B60N 2/0276
See application file for complete search history.

(56) References Cited

U.S. PATENT DOCUMENTS

| | | | | |
|---|---|---|---|---|
| 4,173,357 A | * | 11/1979 | Jahn ...................... | B60R 22/201 |
| | | | | 280/801.2 |
| 5,772,238 A | * | 6/1998 | Breed ..................... | B60R 21/20 |
| | | | | 280/728.2 |

(Continued)

FOREIGN PATENT DOCUMENTS

| | | |
|---|---|---|
| CN | 101374695 A | 2/2009 |
| CN | 104108364 A | 10/2014 |

(Continued)

OTHER PUBLICATIONS

Russian Office Action dated Oct. 12, 2017 in Patent Application No. 2016131489 (Partial English Translation only).

*Primary Examiner* — Adam D Tissot
*Assistant Examiner* — Alex C Dunn
(74) *Attorney, Agent, or Firm* — Oblon, McClelland, Maier & Neustadt, L.L.P.

(57) ABSTRACT

A vehicle seat includes a driving portion capable of changing a position of a seat, a rear-seat airbag that is fixed to the seat and deploys between a seatback portion of the seat and an occupant seating space of a rear seat behind the seat, and a control portion configured to change the position of the seat with the driving portion, and adjust a deployment region of the rear-seat airbag, when a collision of a vehicle is predicted.

7 Claims, 19 Drawing Sheets

(51) Int. Cl.
*B60R 21/16* (2006.01)
*B60R 21/01* (2006.01)

(56) References Cited

U.S. PATENT DOCUMENTS

| | | | | |
|---|---|---|---|---|
| 7,338,069 B2 * | 3/2008 | Breed | ............... | B60R 21/205 280/729 |
| 7,481,453 B2 * | 1/2009 | Breed | ............... | B60N 2/0232 280/738 |
| 7,881,860 B2 * | 2/2011 | Noma | ............... | G60F 17/5095 345/156 |
| 8,398,113 B2 * | 3/2013 | Choi | ............... | B60R 21/207 280/730.1 |
| 8,702,123 B2 * | 4/2014 | Mazanek | ............... | B60R 21/207 280/729 |
| 8,864,232 B2 * | 10/2014 | Hashimoto | ............... | B60N 2/0232 297/344.11 |
| 8,958,955 B2 * | 2/2015 | Hotary | ............... | B60N 2/809 701/49 |
| 9,102,300 B2 * | 8/2015 | Faruque | ............... | B60R 21/261 |
| 9,296,353 B1 * | 3/2016 | Choi | ............... | B60R 21/01554 |
| 9,308,882 B2 * | 4/2016 | Nagasawa | ............... | B60R 21/013 |
| 2011/0098893 A1 | 4/2011 | Hashimoto | | |
| 2012/0007401 A1 * | 1/2012 | Hashimoto | ............... | B60N 2/0232 297/344.13 |
| 2015/0091281 A1 | 4/2015 | Nagasawa | | |

FOREIGN PATENT DOCUMENTS

| | | |
|---|---|---|
| JP | 4-166455 A | 6/1992 |
| JP | 05-3701795 A | 11/1993 |
| JP | 06-278513 A | 10/1994 |
| JP | 07-117600 A | 5/1995 |
| JP | 7-156736 | 6/1995 |
| JP | 2004-352037 | 12/2004 |
| JP | 2009-149263 | 7/2009 |
| JP | 2010-052621 A | 3/2010 |
| JP | 2015-067192 A | 4/2015 |
| JP | 2015-071321 A | 4/2015 |
| RU | 2 352 499 C1 | 4/2009 |
| RU | 2 424 924 C1 | 7/2011 |

* cited by examiner

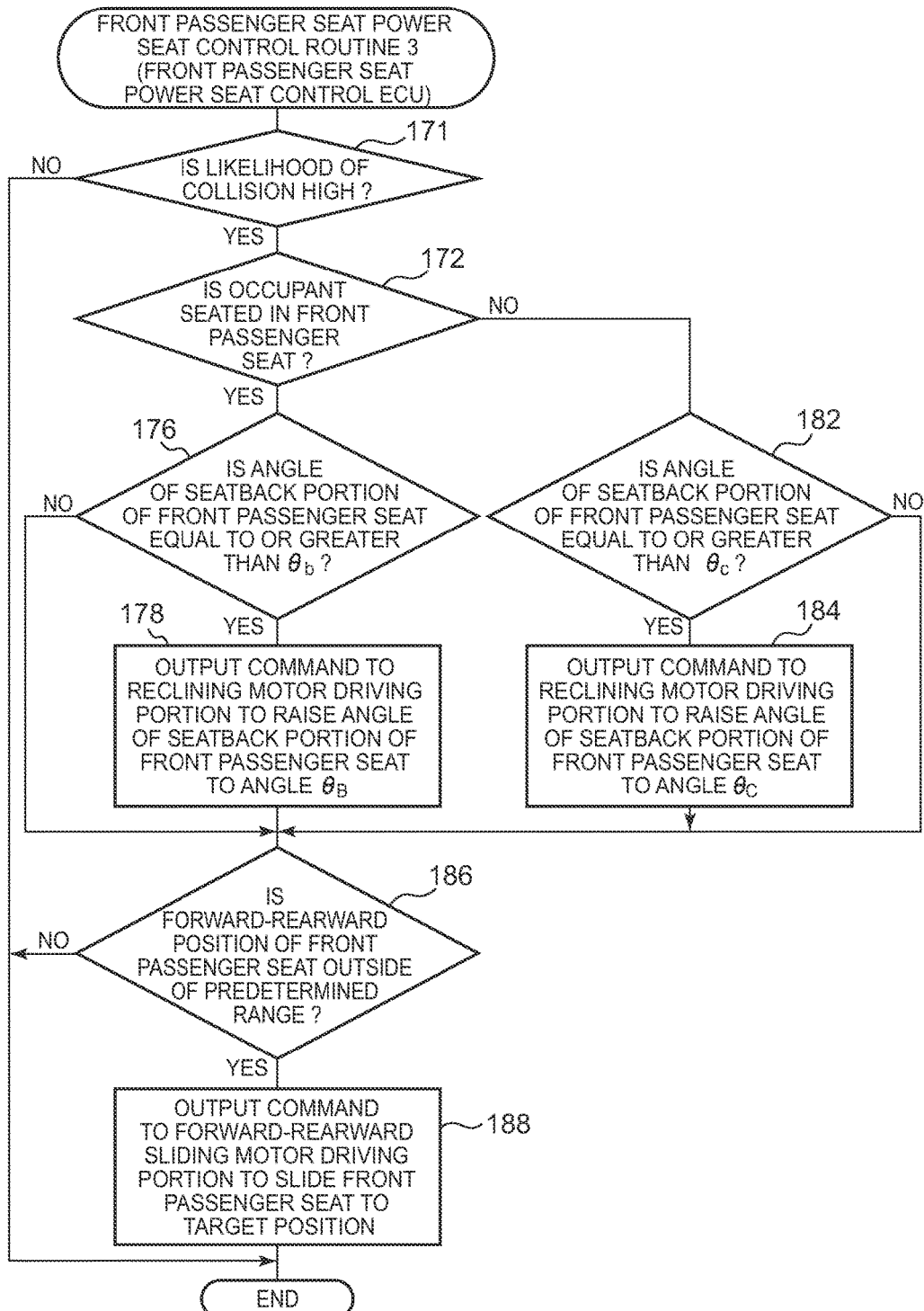

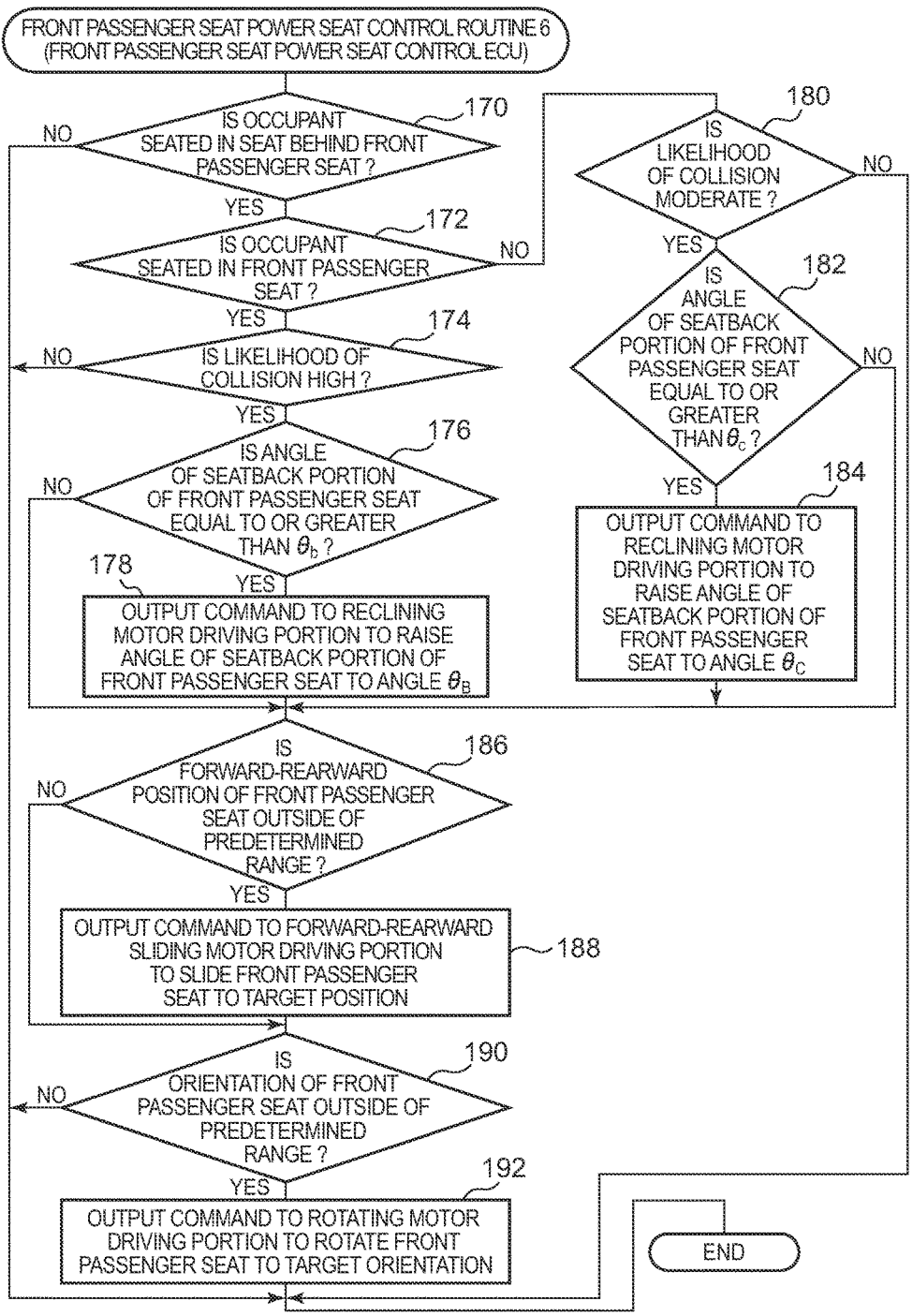

VEHICLE SEAT

INCORPORATION BY REFERENCE

The disclosure of Japanese Patent Application No. 2015-154388 filed on Aug. 4, 2015 including the specification, drawings and abstract is incorporated herein by reference in its entirety.

BACKGROUND

1. Field of the Disclosure

The present disclosure relates to a vehicle seat.

2. Description of Related Art

Japanese Patent Application Publication No. 2010-052621 (JP 2010-052621 A) describes technology that includes a first airbag capable of inflating and deploying toward an occupant in a rear seat on a rear side of a backrest portion of a front seat, and a second airbag capable of inflating and deploying between the backrest portion of the front seat and an occupant in the front seat, and that supplies gas for inflating and deploying from a gas generating portion to both of the airbags separately. The second airbag is designed to have a longer internal pressure retention time than the first airbag.

However, typically, with a vehicle seat, an inclination angle of a seatback portion (backrest portion) of the seat and a position, such as a vehicle forward-rearward position, of the seat are able to be changed. The deployment region of a rear-seat airbag that is fixed to the vehicle seat changes with respect to an occupant seating space of a rear seat as the position of the vehicle seat changes. Therefore, the technology described in JP 2010-052621 A may not be able to effectively restrain a rear-seat occupant with the rear-seat airbag, depending on the position of the vehicle seat when the rear-seat airbag deploys.

As an example, a case will be described in which a rear-seat airbag 202 that is fixed to a seatback portion 200A of a vehicle seat 200 has deployed when the inclination angle of the seatback portion 200A (i.e., the angle of the seatback portion 200A with respect to the vehicle up and down direction) is equal to or greater than a predetermined angle, as shown in FIG. 19. In this case, the deployment region of the rear-seat airbag 202 with respect to a rear-seat occupant 206 seated in a rear seat 204 moves farther downward in the vehicle up and down direction than a proper position, so the head of the rear-seat occupant 206 will not be able to be effectively restrained.

Also, when the rear-seat airbag 202 that is fixed to the seatback portion 200A deploys and restrains the rear-seat occupant 206, a load toward the front of the vehicle is input to the seatback portion 200A, and the rear-seat airbag 202 receives reaction force from the seatback portion 200A. However, if the inclination angle of the seatback portion 200A is equal to or greater than a predetermined angle as shown in FIG. 19, the input angle of the load with respect to the back surface of the seatback portion 200A becomes smaller, so the rear-seat airbag 202 is unable to effectively obtain reaction force from the seatback portion 200A. As a result, the performance of restraining the head of the rear-seat occupant 206 is further reduced.

BRIEF SUMMARY

The present disclosure thus provides a vehicle seat capable of inhibiting a reduction in rear-seat occupant restraint performance by a rear-seat airbag due to the position of a seat.

One aspect of the present disclosure relates to a vehicle seat that includes a driving portion capable of changing a position of a seat; a rear-seat airbag that is fixed to the seat and deploys between a seatback portion of the seat and an occupant seating space of a rear seat behind the seat; and a control portion configured to change the position of the seat with the driving portion, and adjust a deployment region of the rear-seat airbag, when a collision of a vehicle is predicted.

In this aspect, a rear-seat airbag that deploys between the seatback portion of a seat, the position of which is able to be changed by the driving portion, and an occupant seating space of a rear seat behind the seat is fixed to the seat. Also, this control portion adjusts the deployment region of the rear-seat airbag by changing the position of the seat with the driving portion when a collision is predicted. As a result, the rear-seat airbag is able to be deployed after the deployment region of the rear-seat airbag has been adjusted to a position suitable for restraining a rear-seat occupant, by changing the seat position, when a collision is predicted. Thus, this aspect makes it possible to inhibit a decrease in rear-seat occupant restraint performance by a rear-seat airbag due to the position of the seat.

In the aspect described above, the driving portion may be configured so as to be able to change an inclination angle of the seatback portion, the rear-seat airbag may be fixed to the seatback portion, and the control portion may be configured to change the inclination angle of the seatback portion to a predetermined angle with the driving portion when a collision of the vehicle is predicted.

One example of the predetermined angle in this aspect is an angle at which the deployment region of the rear-seat airbag is adjusted to a position suitable for restraining a rear-seat occupant, and the rear-seat airbag is able to effectively obtain reaction force from the seatback portion. Thus, this aspect makes it possible to inhibit a decrease in rear-seat occupant restraint performance by a rear-seat airbag due to the inclination angle of the seatback portion when a collision is predicted.

In the aspect described above, the driving portion may be configured so as to be able to change a vehicle forward-rearward position of the seat, and the control portion may be configured to change the vehicle forward-rearward position of the seat to a predetermined position with the driving portion when a collision of the vehicle is predicted.

One example of the predetermined position in this aspect is a position where the deployment region of the rear-seat airbag is adjusted to a position suitable for restraining a rear-seat occupant. Thus, this aspect makes it possible to inhibit a decrease in rear-seat occupant restraint performance by a rear-seat airbag due to the vehicle forward-rearward position of the seat when a collision is predicted.

In the aspect described above, the driving portion may be configured so as to be able to rotate the seat around an axis that extends in a vehicle up and down direction, and the control portion may be configured to rotate the seat with the driving portion to a predetermined position around the axis that extends in the vehicle up and down direction.

One example of the predetermined position in this aspect is a position in which the deployment region of the rear-seat airbag is adjusted to a position suitable for restraining a rear-seat occupant. This aspect makes it possible to inhibit a decrease in rear-seat occupant restraint performance by a rear-seat airbag due to the position around an axis that extends in the vehicle up and down direction, of the seat when a collision is predicted.

The vehicle seat in the aspect described above may also include a first detecting portion that detects an occupant seated in the seat, and the control portion may be configured to start changing the position of the seat with the driving portion earlier when an occupant is not detected by the first detecting portion than when an occupant is detected by the first detecting portion.

According to the aspect described above, the rear-seat occupant is able to be more reliably restrained when a vehicle collision occurs, by completing the change in the position of the seat earlier when an occupant is not seated in the seat than when an occupant is seated in the seat.

On the other hand, when an occupant is seated in the seat, the position of the seat starts to be changed at a later timing when an occupant is seated in the seat than when an occupant is not seated in the seat when the vehicle is in a collision, i.e., at a timing at which the collision risk is heightened. However, there are cases in which, even if a vehicle collision is predicted, when the collision is able to avoided, the position of the seat does not have to be changed, due to the fact that the collision is no longer predicted before the position of the seat starts to be changed. As a result, when an occupant is seated in the seat, a change in the position of the seat is able to be restricted to only when necessary, so the effect of the change in the seat position on the occupant seated in the seat is able to be reduced. Thus, this aspect makes it possible to perform appropriate control according to whether an occupant is seated in the seat.

The vehicle seat in the aspect described above may also include a second detecting portion that detects an occupant seated in the rear seat behind the seat, and the control portion may be configured to stop control that changes the position of the seat with the driving portion, when an occupant is not detected by the second detecting portion.

In this aspect, the position of the seat is stopped from changing when an occupant is not seated in a rear seat. Thus, a change in the position of the seat is able to be inhibited to only when necessary, which is when an occupant is seated in a rear seat.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 9 is a flowchart of a front passenger seat power seat control routine 3 according to the third example embodiment;

FIG. 17 is a flowchart of a front passenger seat power seat control routine 6 according to the sixth example embodiment;

DETAILED DESCRIPTION OF EMBODIMENTS

Hereinafter, example embodiments of the present disclosure will be described in detail with reference to the accompanying drawings.

First Example Embodiment

Figure 1:
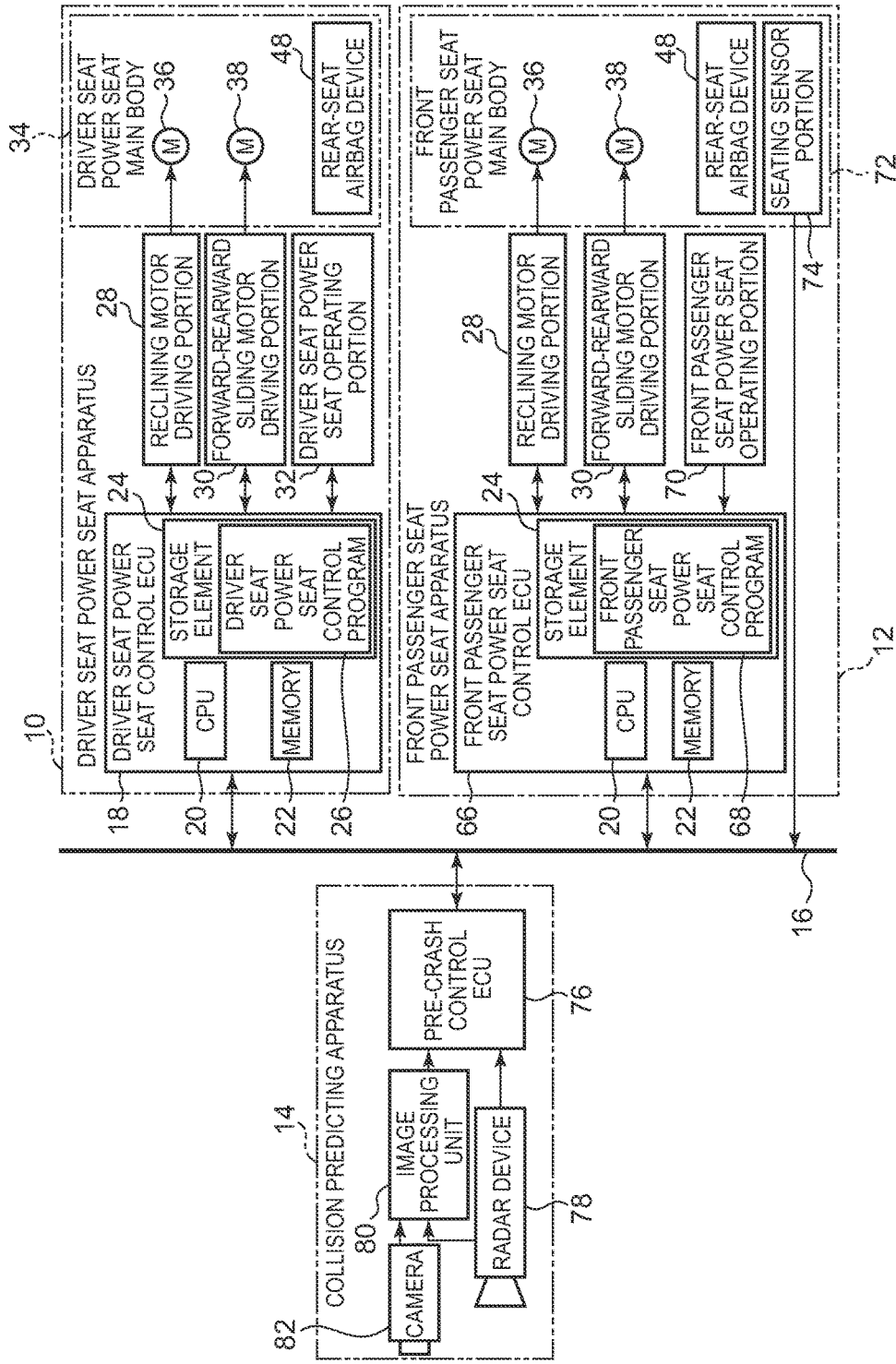
FIG. 1 is a block diagram schematically showing power seat apparatuses and a collision predicting apparatus according to a first example embodiment of the present disclosure.

FIG. 1 is a block diagram schematically showing a driver seat power seat apparatus 10, a front passenger seat power seat apparatus 12, and a collision predicting apparatus 14 according to a first example embodiment of the present disclosure. The driver seat power seat apparatus 10, the front passenger seat power seat apparatus 12, and the collision predicting apparatus 14 form part of a vehicle control system that is mounted in a vehicle and includes a plurality of electronic control units (control units that include computers; hereinafter simply referred to as "ECUs") that each perform a different control. The driver seat power seat apparatus 10, the front passenger seat power seat apparatus 12, and the collision predicting apparatus 14 are connected together via a bus 16 to which the ECUs of the vehicle control system are each connected.

The driver seat power seat apparatus 10 includes a driver seat power seat control ECU 18 (hereinafter, simply referred to as "ECU 18"). The ECU 18 includes a CPU 20, memory 22, and a nonvolatile storage element 24 that stores a driver seat power seat control program 26. A reclining motor driving portion 28, a forward-rearward sliding motor driving portion 30, and a driver seat power seat operating portion 32 are each connected to the ECU 18. The reclining motor driving portion 28 controls the driving of a reclining motor 36 provided on a driver seat power seat main body 34, and the forward-rearward sliding motor driving portion 30 controls the driving of a forward-rearward sliding motor 38 provided on the driver seat power seat main body 34.

Figure 2:
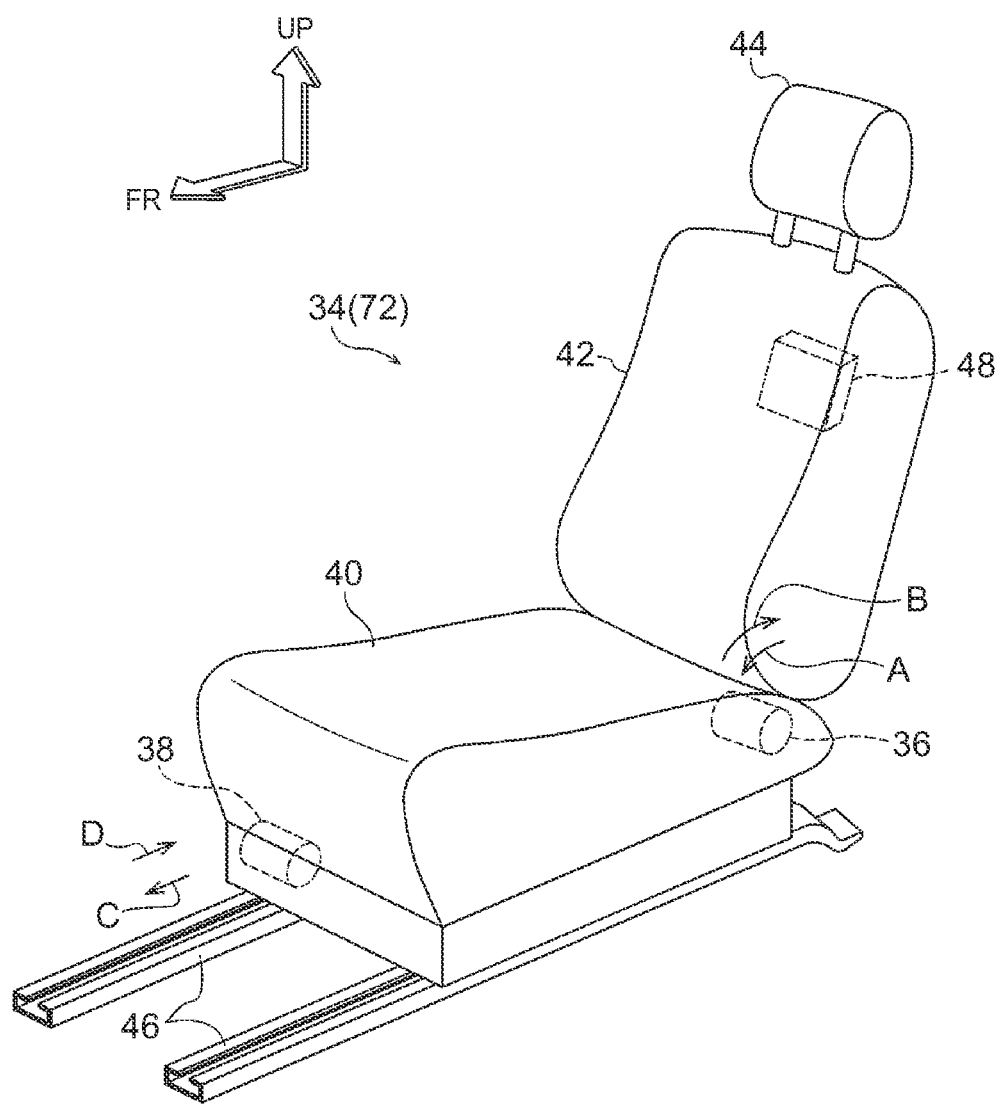
FIG. 2 is a perspective view of a power seat main body according to the first example embodiment.

As shown in FIG. 2, the driver seat power seat main body 34 (hereinafter, simply referred to as "driver seat 34") includes a seat cushion portion 40, a seatback portion 42, and a headrest portion 44. The headrest portion 44 is attached so as to be able to slide in a length direction of the seatback portion 42, on an upper end portion of the seatback portion 42 in the vehicle up and down direction. A lower end portion of the seatback portion 42 in the vehicle up and down direction is attached to a rear end portion of the seat cushion portion 40 in the vehicle front-rear direction via a pivot mechanism, not shown, and is able to pivot around an axis that extends the vehicle width direction (i.e., pivot in the directions of arrows A and B in FIG. 2) with respect to the seat cushion portion 40.

The reclining motor 36 is built into the seat cushion portion 40. A rotating shaft of the reclining motor 36 is connected to the pivot portion described above via a reduction mechanism, not shown. Therefore, when the reclining motor 36 is driven, the seatback portion 42 pivots in the direction of arrow A or arrow B in FIG. 2 with respect to the seat cushion portion 40, depending on the rotational direction of the rotating shaft of the reclining motor 36. The reclining motor driving portion 28 is able to change an angle θ (an angle θ in the length direction of the seatback portion 42 with respect to the vehicle up and down direction; see also FIG. 6), by controlling the starting and stopping of the driving of the reclining motor 36, and the rotational direction and rotation speed of the rotating shaft when driving the reclining motor 36.

Also, the reclining motor driving portion 28 recognizes the angle of the seatback portion 42. The angle of the seatback portion 42 may be recognized, for example, by obtaining a signal from a sensor that detects the angle of the seatback portion 42 or a rotation amount of the rotating shaft of the reclining motor 36, or, if the reclining motor 36 is a pulse motor, by counting a pulse number of a pulse signal output to the reclining motor 36. Also, when a target angle of the seatback portion 42 is input from the ECU 18, the reclining motor driving portion 28 controls the driving of the reclining motor 36 such that the recognized angle of the seatback portion 42 matches the input target angle.

Also, a pair of seat rails 46 that extend in the vehicle front-rear direction are arranged parallel to each other and spaced apart in the vehicle width direction on a floor of the vehicle. An engaging mechanism that engages with the seat rails 46 and is able to slide along the seat rails 46 is mounted to a bottom portion of the seat cushion portion 40, such that the seat cushion portion 40, i.e., the driver seat 34, is able to slide in the vehicle front-rear direction (i.e., in the directions of arrows C and D in FIG. 2) along the seat rails 46.

The forward-rearward sliding motor 38 is built into the seat cushion portion 40. The forward-rearward sliding motor 38 is configured such that rotary force of a rotating shaft thereof is transmitted to the seat rails 46 as driving force that slides the seat cushion portion 40 in the vehicle front-rear direction via a reduction mechanism, not shown. Therefore, when the forward-rearward sliding motor 38 is driven, the driver seat 34 slides in the direction of arrow C or arrow D in FIG. 2, depending on the rotational direction of the rotating shaft. The forward-rearward sliding motor driving portion 30 is able to change a vehicle forward-rearward position of the driver seat 34 by controlling the starting and stopping of the driving of the forward-rearward sliding motor 38, and the rotational direction and rotation speed of the rotating shaft when driving the forward-rearward sliding motor 38.

Also, the forward-rearward sliding motor driving portion 30 recognizes the vehicle forward-rearward position of the driver seat 34. The vehicle forward-rearward position of the driver seat 34 may be recognized, for example, by obtaining a signal from a sensor that detects the vehicle forward-rearward position of the driver seat 34 or a rotation amount of the rotating shaft of the forward-rearward sliding motor 38, or, if the forward-rearward sliding motor 38 is a pulse motor, by counting a pulse number of a pulse signal output to the forward-rearward sliding motor 38. Also, when a target position in the vehicle forward-rearward direction of the driver seat 34 is input from the ECU 18, the forward-rearward sliding motor driving portion 30 controls the driving of the forward-rearward sliding motor 38 such that the recognized vehicle forward-rearward position of the driver seat 34 matches the input target position.

The driver seat power seat operating portion 32 is provided with a first switch for specifying a change of angle of the seatback portion 42 and the direction of this change, and a second switch for specifying a change in the vehicle forward-rearward position of the driver seat 34 and the direction of this change. When the first switch of the driver seat power seat operating portion 32 is operated, the ECU 18 outputs a command signal to the reclining motor driving portion 28 to drive the reclining motor 36 so that the angle of the seatback portion 42 changes in the direction specified by the operation of the first switch. Also, when the second switch of the driver seat power seat operating portion 32 is operated, the ECU 18 outputs a command signal to the forward-rearward sliding motor driving portion 30 to drive the forward-rearward sliding motor 38 so that the driver seat 34 moves in the direction specified by the operation of the second switch.

The ECU 18 executes a driver seat power seat control routine that will be described later, by the driver seat power seat control program 26 being read from the storage element 24 and moved to the memory 22, and then the driver seat power seat control program 26 that has been moved to the memory 22 being executed by the CPU 20. Although described in detail later, in a driver seat power seat control routine 1 described in the first example embodiment, when a vehicle collision is predicted by the collision predicting apparatus 14, a target angle of the seatback portion 42 is output to the reclining motor driving portion 28 and the reclining motor 36 is consequently driven so that the angle of the seatback portion 42 comes to match the target angle, as necessary.

In the first example embodiment, a mode is described in which only the angle of the seatback portion 42 is changed as necessary when a vehicle collision is predicted. A mode in which the vehicle forward-rearward position of the driver seat 34 is also changed as necessary will be described in a third example embodiment that will be described later.

Also, the ECU 18 is one example of a control portion, and the reclining motor driving portion 28, the forward-rearward sliding motor driving portion 30, the reclining motor 36, and the forward-rearward sliding motor 38 are each examples of a driving portion. Also, the ECU 18 may also be realized by, for example, a semiconductor integrated circuit, or more specifically, an ASIC (Application Specific Integrated Circuit) or the like.

Figure 3:
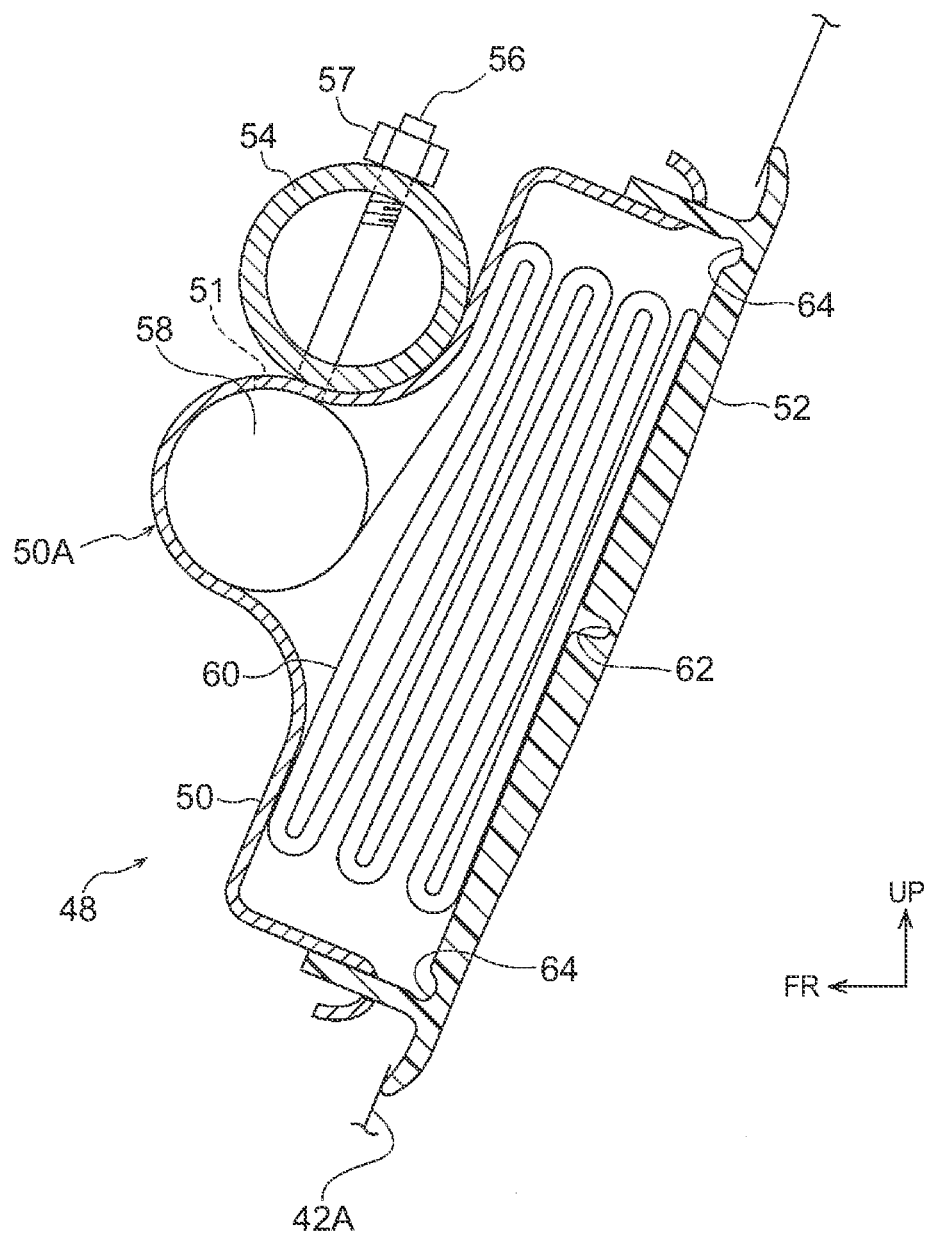
FIG. 3 is a sectional view of a rear-seat airbag device.

Meanwhile, a rear-seat airbag device 48 is built into a back surface side of the seatback portion 42 of the driver seat 34. As shown in FIG. 3, the rear-seat airbag device 48 includes a metal module case 50 that is box-shaped with an opening, and has a protruding portion 50A that protrudes toward the front side of the seat, on a bottom surface that faces an opening plane. A pair of elongated bolt insertion holes 51 for inserting stud bolts 56, described later, are formed in an upper portion of the protruding portion 50A. The opening of the module case 50 is closed off by a resin airbag door 52, and an outer surface of the airbag door 52 is arranged in a position substantially flush with a back surface 42A of the seatback portion 42.

A cylindrical inflator 58 and a folded-up airbag 60 are housed inside of the module case 50 described above. The inflator 58 is housed inside of the airbag 60, and inflates the airbag 60 by generating inflating gas at the time of a vehicle collision. The pair of stud bolts 56 are provided erect on an outer peripheral portion of the inflator 58. The inflator 58 is housed inside the protruding portion 50A with this pair of stud bolts 56 inserted from below at an angle into the bolt insertion holes 51 that are formed in an upper portion of the protruding portion 50A. Then, the stud bolts 56 are inserted into a pair of insertion holes formed in a seatback frame 54, and nuts 57 are screwed onto the stud bolts 56, such that the rear-seat airbag device 48 is fastened to the seatback frame 54.

A thin tear portion 62 is formed in a roughly the center of the opening of the module case 50, on an inside surface (a surface that faces the folded-up airbag 60) of the airbag door 52. The tear portion 62 is a designed breakaway portion that tears under the expansion pressure of the airbag 60. Although not shown in FIG. 3, the tear portion 62 is formed in a continuous H-shape, for example, when viewed from the rear seat side, on a portion of the airbag door 52 that corresponds to the opening of the module case 50.

Also, a hinge portion 64 that is a thin portion that is thicker than the tear portion 62 is continuously formed in the vehicle width direction near both end portions in the vehicle up and down direction of a portion of the inside surface of the airbag door 52 that corresponds to the opening of the module case 50. When the tear portion 62 tears when the airbag 60 inflates and deploys, the airbag door 52 becomes a pair of upper and lower doors with the hinge portions 64 as the hinges, with the upper door opening upward with respect to the vehicle and the lower door opening downward with respect to the vehicle, like a pair of double doors. Therefore, when the airbag 60 inflates and deploys, the airbag 60 deploys in a deployment region 88 (a region between the seatback portion 42 and an occupant seating space 86 of a rear seat 84) shown in FIG. 6B, for example.

With the front passenger seat power seat apparatus 12, portions that are the same as those of the driver seat power seat apparatus 10 are denoted by like reference characters, and descriptions thereof will be omitted. The front passenger seat power seat apparatus 12 differs from the driver seat power seat apparatus 10 in that i) the front passenger seat power seat apparatus 12 includes a front passenger seat power seat control ECU 66 (hereinafter, simply referred to as "ECU 66") instead of the ECU 18, ii) a front passenger seat power seat control program 68 is stored in the storage element 24 of the ECU 66, and iii) a front passenger seat power seat operating portion 70 instead of the driver seat power seat operating portion 32 is connected to the ECU 66.

With a front passenger seat power seat main body 72 (hereinafter, simply referred to as the "front passenger seat 72") as well, portions that are the same as those of the driver seat 34 will be denoted by like reference characters, and descriptions thereof will be omitted. The front passenger seat 72 differs from the driver seat 34 in that the front passenger seat 72 is provided with a seating sensor portion 74 that includes a seating sensor that is built into the seat cushion portion 40 and detects a change in load that occurs when an occupant is seated (i.e., sits down), and a detection signal transmitting portion. The seating sensor portion 74 is connected to the bus 16, and a detection signal output from the seating sensor portion 74 is input to the ECU 66 of the front passenger seat power seat apparatus 12 via the bus 16.

Meanwhile, the collision predicting apparatus 14 includes a pre-crash control ECU 76. A radar device 78 is connected to the pre-crash control ECU 76. A camera 82 is also connected to the pre-crash control ECU 76 via an image processing unit 80. The radar device 78 detects an object such as a pedestrian or another vehicle around the vehicle as point information, and obtains a relative positional relationship and relative speed of the vehicle and the detected object. Also, the radar device 78 has a built-in processing unit that processes detection results of a nearby object. The processing unit tracks and monitors specific objects such as pedestrians and other vehicles (monitored objects), while ignoring noise and roadside objects such as guardrails and the like (non-monitored objects) based on changes in the relative positional relationship and relative speed, based on a plurality of the most recent detection results. Information such as the relative positional relationship and the relative speed of each monitored object is output to the image processing unit 80 and the pre-crash control ECU 76.

The camera 82 is mounted in a position where it is able to capture an image of an area around the vehicle. An image obtained as a result of the camera 82 capturing an image of the area around the vehicle is input to the image processing unit 80. The image processing unit 80 recognizes image portions that correspond to the monitored objects in the image received from the camera 82, based on the information such as the relative positional relationship and the like with each of the monitored objects received from the radar device 78. The image processing unit 80 also detects a width dimension and center position of each monitored object by the principle of triangulation, based on the position and range of the recognized image portion on the image. Further, the image processing unit 80 extracts a predetermined amount of characteristic from a recognized image portion, and distinguishes between different types of monitored objects (e.g., whether a monitored object is a pedestrian or a vehicle) based on the extracted amount of characteristic. Similar to the radar device 78, the image processing unit 80 also tracks and follows a monitored object, by repeating the processing described above at regular cycles, and outputs detection results regarding the center position, width dimension, and type of each monitored object to the pre-crash control ECU 76.

The pre-crash control ECU 76 performs a pre-crash control process that predicts and determines the likelihood of a collision actually occurring, by calculating the distance and time to the monitored object, while obtaining the relative positional relationship between the vehicle and an object that is a monitored object around the vehicle, based on information such as the center position and width dimension of each monitored object received from the image processing unit 80, and the relative positional relationship and relative speed and the like of each monitored object received from the radar device 78. Then, if a monitored object for which the probability of a collision with the vehicle is equal to or greater than a predetermined value is detected, the ECUs of the vehicle control system are notified via the bus 16 that a vehicle collision is predicted.

There are several conceivable modes of collision prediction notification. A first mode is a mode that involves the collision predicting apparatus 14 outputting a signal that differs according to collision risk. For example, when it is predicted that a collision will occur after a time a has passed, a collision warning signal indicating that the likelihood of a collision is high is output, and when it is predicted that a collision will occur after a time b (where b<a) has passed, a collision anticipated signal indicating that a collision is unavoidable is output. For the times a and b, time a may be 1 second and time b may be 0.5 second, for example, but the times a and b are not limited to these values. In the first mode, ECUs (including the ECUs 18 and 66) of the vehicle control system that perform some sort of process at the time of a collision prediction recognize whether there is a collision prediction and the collision risk when a collision is predicted, by the input, or lack thereof, of the various signals described above.

A second mode is a mode that involves the collision predicting apparatus 14 outputting collision risk information indicating the collision risk either regularly or when a collision is predicted. In the second mode, ECUs (including the ECUs 18 and 66) of the vehicle control system that perform some sort of process at the time of a collision prediction recognize whether there is a collision prediction and the collision risk when a collision is predicted, by comparing the collision risk indicated by the received collision risk information with a preset threshold value. Also, as a modified example of the second mode, a mode in which the collision predicting apparatus 14 reads the collision risk information into shared memory, and the ECUs suitably reference the collision risk information read into the shared memory, is also conceivable.

In the example embodiment described below, the first mode, the mode in which the collision predicting apparatus 14 outputs a collision warning signal indicating that the likelihood of a collision is high when it is predicted that a collision will occur after the time a has passed, and outputs a collision anticipated signal indicating that a collision is unavoidable when it is predicted that a collision will occur after the time b (where b<a) has passed, is described. However, the present disclosure is of course not limited to this.

The collision predicting apparatus 14 is not limited to the structure described above. For example, the radar device 78 may be omitted, and the collision predicting apparatus 14 may be configured to perform the pre-crash control process described above from an image captured by the camera 82. In particular, in this case, the camera 82 is preferably a stereo camera.

Figure 4:
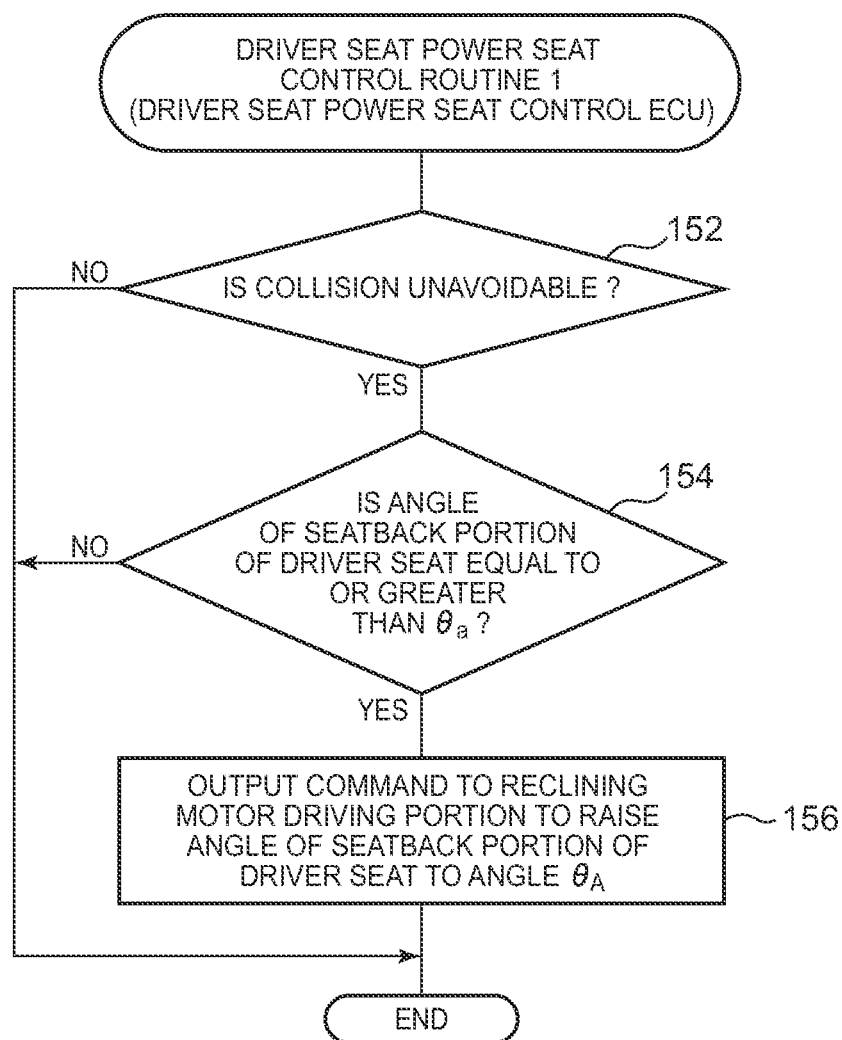
FIG. 4 is a flowchart of a driver seat power seat control routine 1 according to the first example embodiment.

Next, as the operation of the first example embodiment, first, a driver seat power seat control routine 1 executed by the ECU 18 will be described with reference to FIG. 4. The driver seat power seat control routine 1 is executed at intervals by the ECU 18.

In step 152 in the driver seat power seat control routine 1, the ECU 18 determines whether a vehicle collision is unavoidable based on whether a collision anticipated signal has been output from the collision predicting apparatus 14. If the determination is NO, then this cycle of the routine ends. Also, if the determination in step 152 is YES, the process proceeds on to step 154. In step 154, the ECU 18 obtains an angle θ of the seatback portion 42 of the driver seat 34 ascertained by the reclining motor driving portion 28, and determines whether the obtained angle of the seatback portion 42 of the driver seat 34 is equal to or greater than a predetermined angle $\theta_a$ that has been set in advance.

The predetermined angle $\theta_a$ is set to an angle no less than a predetermined angle $\theta_b$ and greater than a predetermined angle $\theta_c$ used in a determination in a front passenger seat power seat control routine that will be described later, taking into consideration three conditions: (1) that protection performance with respect to an occupant in the rear seat 84 be ensured, (2) that protection performance with respect to an occupant in the driver seat 34 be ensured, and (3) that an effect on driving by the occupant in the driver seat 34 be suppressed. The predetermined angle $\theta_a$ may be set at 29° or a value therearound, for example, but is not limited to this value.

Figure 6A:
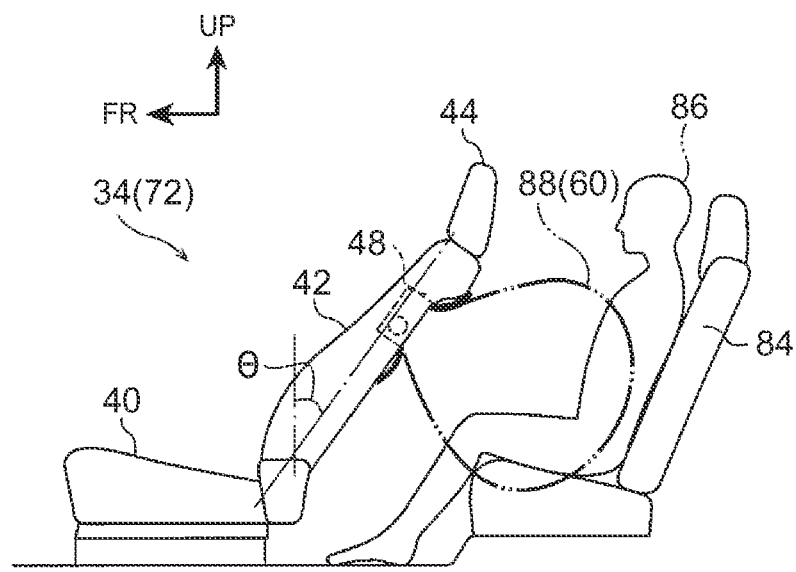
FIG. 6A is a schematic view of a change in the deployment region of a rear-seat airbag following a change in the angle of a seatback portion, when the seatback portion is not in a proper position.
Figure 6B:
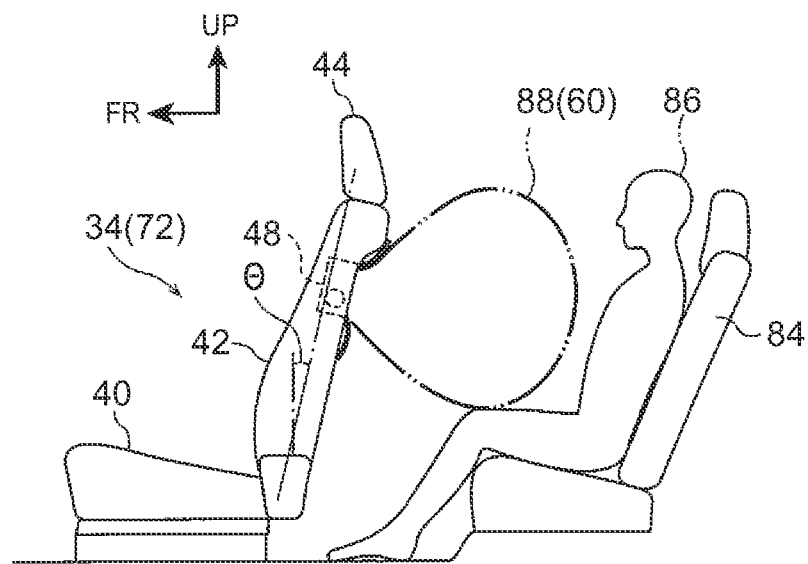
FIG. 6B is a schematic view of a change in the deployment region of the rear-seat airbag following a change in the angle of the seatback portion, when the seatback portion is in a proper position.

If the determination in step 154 is YES, it is highly likely that the deployment region 88 when the airbag 60 of the rear-seat airbag device 48 that is fixed to the driver seat 34 inflates and deploys is off, as shown in FIG. 6A, from the proper position shown in FIG. 6B, such that when a vehicle collision occurs, the inflated and deployed airbag 60 may not be able to effectively restrain an occupant seated in the rear seat 84 directly behind the driver seat 34 (in FIG. 6, reference character "86" denotes the occupant seating space of the rear seat). In particular, when the angle θ of the seatback portion 42 is large, as shown in FIG. 6A, the airbag 60 is unable to effectively obtain reaction force from the seatback portion 42 due to the fact that the angle between the back surface of the seatback portion 42 and the input direction of the load into the seatback portion 42 from the airbag 60 that has inflated and deployed and restrained the rear-seat occupant is smaller. As a result, the rear-seat occupant restraint performance by the airbag 60 is further reduced.

Therefore, if the determination in step 154 is YES, the process proceeds on to step 156. In step 156, the ECU 18 outputs a command to the reclining motor driving portion 28 to raise the seatback portion 42 of the driver seat 34 to a target angle $\theta_A$. This target angle $\theta_A$ may be the same angle as the predetermined angle $\theta_a$ described above, or it may be a different angle. Also, upon receiving the command, the reclining motor driving portion 28 drives the reclining motor 36 such that the angle θ of the seatback portion 42 of the driver seat 34 comes to match the target angle $\theta_A$.

As a result, the seatback portion 42 of the driver seat 34 pivots to the position shown in FIG. 6B or a position near this position, such that the position of the driver seat 34 changes to a position where the airbag 60 that has inflated and deployed at the time of a vehicle collision is able to effectively restrain an occupant in the rear seat 84 directly behind the driver seat 34. That is, the deployment region 88 when the airbag 60 inflates and deploys moves to the proper position shown in FIG. 6B as the position of the driver seat 34 changes. Also, when the airbag 60 inflates and deploys and restrains the rear-seat occupant, the angle between the back surface of the seatback portion 42 and the input direction of the load into the seatback portion 42 from the airbag 60 becomes larger, so the airbag 60 is able to effectively obtain reaction force from the seatback portion 42.

On the other hand, if the determination in step 154 is NO, it can be determined that the current position of the driver seat 34 is a position where the airbag 60 that has inflated and deployed at the time of a vehicle collision is able to effectively restrain the occupant in the rear seat 84 directly behind the driver seat 34, so this cycle of the routine ends without changing the position of the driver seat 34.

With the driver seat power seat control routine 1 described above, it is possible to inhibit a decrease in rear-seat occupant restraint performance by the rear-seat airbag device 48, and also ensure protection performance with respect to an occupant in the driver seat 34, according to the angle of the seatback portion 42 of the driver seat 34 when a vehicle collision is unavoidable. Also, the angle of the seatback portion 42 of the driver seat 34 is changed only when it is determined by the output of a vehicle anticipated signal that a vehicle collision is unavoidable, and the angle $\theta$ of the seatback portion 42 of the driver seat 34 is equal to or greater than the predetermined angle $\theta_a$. Therefore, for example, if a collision is able to be avoided and consequently a collision anticipated signal is not output even though a collision warning signal was output, or if the angle $\theta$ of the seatback portion 42 is less than the predetermined angle $\theta_a$, the angle of the seatback portion 42 will not be changed. As a result, driving by an occupant in the driver seat 34 is affected by a change in the angle of the seatback portion 42 only when necessary.

Figure 5:
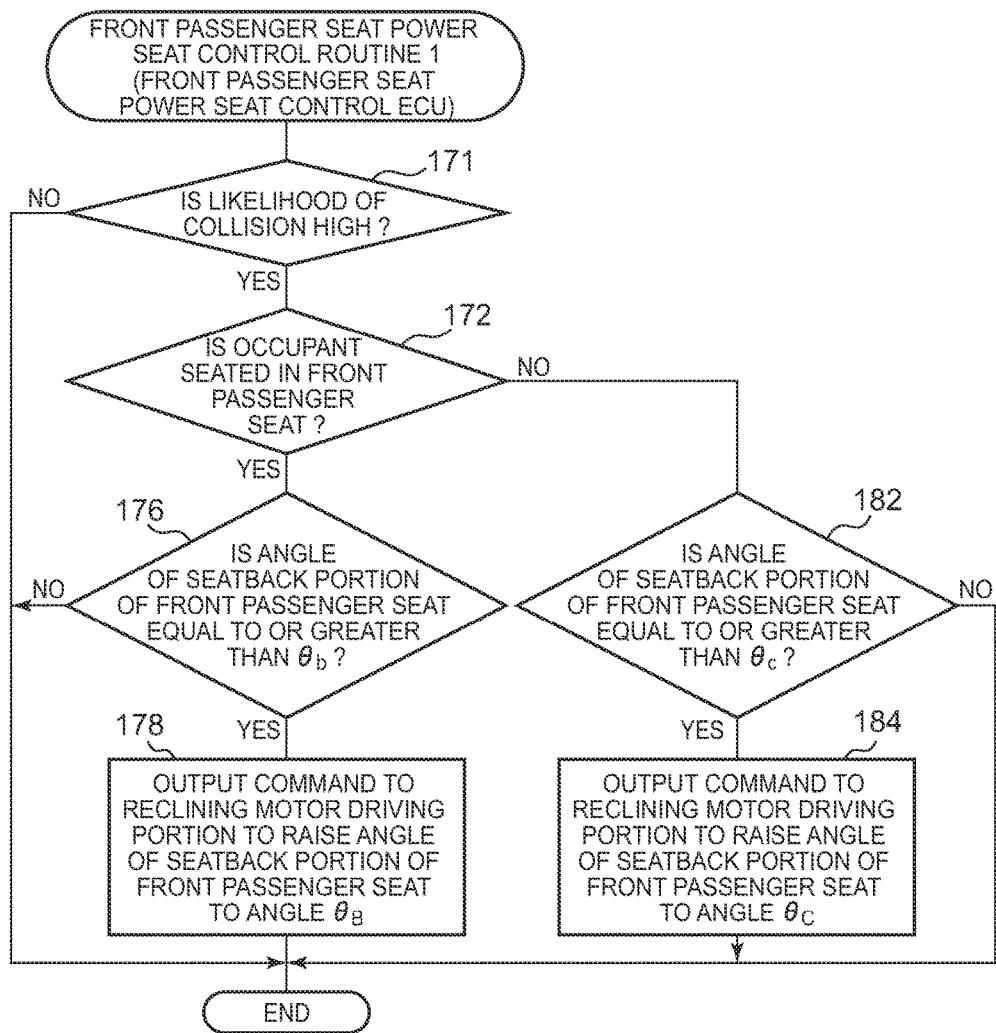
FIG. 5 is a flowchart of a front passenger seat power seat control routine 1 according to the first example embodiment.

Next, a front passenger seat power seat control routine 1 executed by the ECU 66 will be described with reference to FIG. 5. This front passenger seat power seat control routine 1 is executed at intervals by the ECU 66.

In step 171 of the front passenger seat power seat control routine 1, the ECU 66 determines whether the likelihood of a vehicle collision is high, based on whether a collision warning signal has been output from the collision predicting apparatus 14. If the determination is NO, this cycle of the routine ends.

Also, if the determination in step 171 is YES, the process proceeds on to step 172. In step 172, the ECU 66 determines whether an occupant is seated in the front passenger seat 72, based on a detection signal output from the seating sensor portion 74. If an occupant is seated in the front passenger seat 72, the process proceeds on to step 176. In step 176, the ECU 66 obtains the angle of the seatback portion 42 of the front passenger seat 72 ascertained by the reclining motor driving portion 28, and determines whether the obtained angle $\theta$ of the seatback portion 42 of the front passenger seat 72 is equal to or greater than a predetermined angle $\theta_b$ that has been set in advance.

Also, if an occupant is not seated in the front passenger seat 72, the process proceeds on to step 182. In step 182, the ECU 66 obtains the angle of the seatback portion 42 of the front passenger seat 72 ascertained by the reclining motor driving portion 28, and determines whether the obtained angle $\theta$ of the seatback portion 42 of the front passenger seat 72 is equal to or greater than a predetermined angle $\theta_c$ that has been set in advance.

The predetermined angle $\theta_b$ is set taking into consideration two conditions: (1) that protection performance with respect to an occupant in the rear seat 84 be ensured, and (2) that protection performance with respect to an occupant in the front passenger seat 72 be ensured. The predetermined angle $\theta_c$ is set taking into consideration the condition: (1) that protection performance with respect to an occupant in the rear seat 84 be ensured. More specifically, the predetermined angle $\theta_b$ and $\theta_c$ are set to an angle that satisfies the relationship of $\theta_a \geq \theta_b > \theta_c$, including the predetermined angle $\theta_a$ used in the determination in the driver seat power seat control routine 1 described above. The predetermined angle $\theta_b$ may be set at 21° or a value therearound, for example, and the predetermined angle $\theta_c$ may be set at 15° or a value therearound, for example, but these predetermined angles $\theta_b$ and $\theta_c$ are not limited to these values.

If the determination in step 176 or 182 is YES, it is highly likely that the deployment region 88 when the airbag 60 of the rear-seat airbag device 48 that is fixed to the front passenger seat 72 inflates and deploys will be off, as shown in FIG. 6A, from the proper position shown in FIG. 6B, such that when a vehicle collision occurs, the inflated and deployed airbag 60 may not be able to effectively restrain an occupant seated in the rear seat 84 directly behind the front passenger seat 72. In particular, when the angle of the seatback portion 42 is large, as shown in FIG. 6A, the airbag 60 is unable to effectively obtain reaction force from the seatback portion 42 due to the fact that the angle between the back surface of the seatback portion 42 and the input direction of the load into the seatback portion 42 from the airbag 60 that has inflated and deployed and restrained the rear-seat occupant is smaller. As a result, the rear-seat occupant restraint performance by the airbag 60 is further reduced.

Therefore, if an occupant is seated in the front passenger seat 72 and the angle $\theta$ of the seatback portion 42 of the front passenger seat 72 is equal to or greater than the predetermined angle $\theta_b$, the determination in step 176 is YES and the process proceeds on to step 178. In step 178, the ECU 66 outputs a command to the reclining motor driving portion 28 to raise the seatback portion 42 of the front passenger seat 72 to a target angle $\theta_B$. This target angle $\theta_B$ may be the same angle as the predetermined angle $\theta_b$ described above, or it may be a different angle. Also, upon receiving the command, the reclining motor driving portion 28 drives the reclining motor 36 such that the angle $\theta$ of the seatback portion 42 of the front passenger seat 72 comes to match the target angle $\theta_B$.

Also, if an occupant is not seated in the front passenger seat 72 and the angle $\theta$ of the seatback portion 42 of the front passenger seat 72 is equal to or greater than the predetermined angle $\theta_c$, the determination in step 182 is YES and the process proceeds on to step 184. In step 184, the ECU 66 outputs a command to the reclining motor driving portion 28 to raise the seatback portion 42 of the front passenger seat 72 to a target angle $\theta_C$. This target angle $\theta_C$ may be the same angle as the predetermined angle $\theta_c$ described above, or it may be a different angle. Also, upon receiving the command, the reclining motor driving portion 28 drives the reclining motor 36 such that the angle $\theta$ of the seatback portion 42 of the front passenger seat 72 comes to match the target angle $\theta_C$.

As a result of step 178 or step 184, the seatback portion 42 of the front passenger seat 72 pivots to the position shown in FIG. 6B or a position close to this position, such that the position of the front passenger seat 72 changes to a position where the airbag 60 that has inflated and deployed at the time of a vehicle collision is able to effectively restrain an occupant in the rear seat 84 directly behind the front passenger seat 72. That is, the deployment region 88 when the airbag 60 inflates and deploys moves to the proper position shown in FIG. 6B as the position of the front passenger seat 72 changes. Also, when the airbag 60 inflates and deploys and restrains the rear-seat occupant, the angle between the back surface of the seatback portion 42 and the input direction of the load into the seatback portion 42 from the airbag 60 becomes larger, so the airbag 60 is able to effectively obtain reaction force from the seatback portion 42.

On the other hand, if the determination in step 176 or step 182 is NO, it can be determined that the current position of the front passenger seat 72 is a position where the airbag 60 that has inflated and deployed at the time of a vehicle collision is able to effectively restrain the occupant in the rear seat 84 directly behind the front passenger seat 72, so this cycle of the routine ends without changing the position of the front passenger seat 72.

With the front passenger seat power seat control routine 1 described above, it is possible to inhibit a decrease in rear-seat occupant restraint performance by the rear-seat airbag device 48 according to the angle of the seatback portion 42 of the front passenger seat 72 when the likelihood of a vehicle collision is high. The predetermined angle as the threshold value for pivoting the seatback portion 42 and the target angle of the seatback portion 42 are switched depending on whether an occupant is seated in the front passenger seat 72. Therefore, when an occupant is seated in the front passenger seat 72, protection performance with respect to the occupant seated in the front passenger seat 72, in addition to protection performance with respect to the occupant in the rear seat 84, is ensured, and when an occupant is not seated in the front passenger seat 72, protection performance with respect to an occupant in the rear seat 84 is able to be even further improved.

Instead of combining the driver seat power seat control routine 1 described above with the front passenger seat power seat control routine 1 described above, the driver seat power seat control routine 1 may be combined with any one of front passenger seat power seat control routines 2 to 6 described in second to sixth example embodiments below.

Also, instead of combining the front passenger seat power seat control routine 1 described above with the driver seat power seat control routine 1 described above, the front passenger seat power seat control routine 1 may be combined any one of a mode in which the ECU 18 does not execute a driver seat power seat control routine that will be described next in a second example embodiment, a driver seat power seat control routine 2 that will be described in a third example embodiment, and a driver seat power seat control routine 3 that will be described in a fourth example embodiment.

Second Example Embodiment

Next, a second example embodiment of the present disclosure will be described. The second example embodiment has the same structure as the first example embodiment, so portions will be denoted by the same reference characters and descriptions thereof will be omitted. Below, the operation of the second example embodiment will be described for only those portions that differ from the first example embodiment.

The second example embodiment is a mode in which the present disclosure is applied to only the front passenger seat power seat apparatus 12, from among the driver seat power seat apparatus 10 and the front passenger seat power seat apparatus 12. The ECU 18 does not execute a driver seat power seat control routine.

Figure 7:
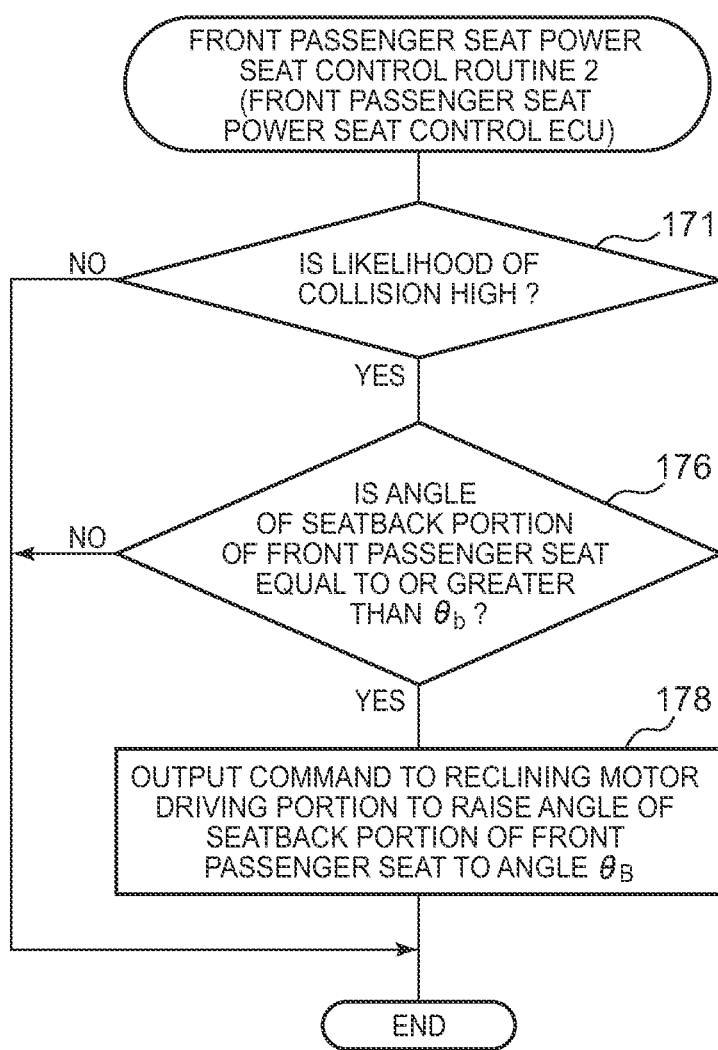
FIG. 7 is a flowchart of a front passenger seat power seat control routine 2 according to a second example embodiment of the present disclosure.

Also, in the second example embodiment, the ECU 66 executes a front passenger seat power seat control routine 2 shown in FIG. 7. The front passenger seat power seat control routine 2 differs from the front passenger seat power seat control routine 1 (FIG. 5) described in the first example embodiment in that steps 172, 182, and 184 are omitted. Therefore, in the second example embodiment, the seatback portion 42 is pivoted to the target angle $\theta_B$ when the likelihood of a vehicle collision is high and the angle θ of the seatback portion 42 of the front passenger seat 72 is equal to or greater than the predetermined angle $\theta_b$.

With this front passenger seat power seat control routine 2, it is possible to inhibit a decrease in rear-seat occupant restraint performance by the rear-seat airbag device 48, and also ensure protection performance with respect to an occupant in the front passenger seat 72, according to the angle of the seatback portion 42 of the front passenger seat 72 when the likelihood of a vehicle collision is high. Also, compared to the first example embodiment, the load on the ECU 66 is reduced, and the present disclosure may also be applied to a vehicle in which the seating sensor portion 74 is not provided in the front passenger seat 72.

Instead of combining the front passenger seat power seat control routine 2 described above with the mode in which the ECU 18 does not perform a driver seat power seat control routine, the front passenger seat power seat control routine 2 may be combined with any one of the driver seat power seat control routine 1 described in the first example embodiment, a driver seat power seat control routine 2 that will be described in the third example embodiment, and a driver seat power seat control routine 3 that will be described in the fourth example embodiment.

Third Example Embodiment

Next, a third example embodiment of the present disclosure will be described. The third example embodiment has the same structure as the first example embodiment, so portions will be denoted by the same reference characters and descriptions thereof will be omitted. Below, the operation of the third example embodiment will be described for only those portions that differ from the first example embodiment.

Figure 8:
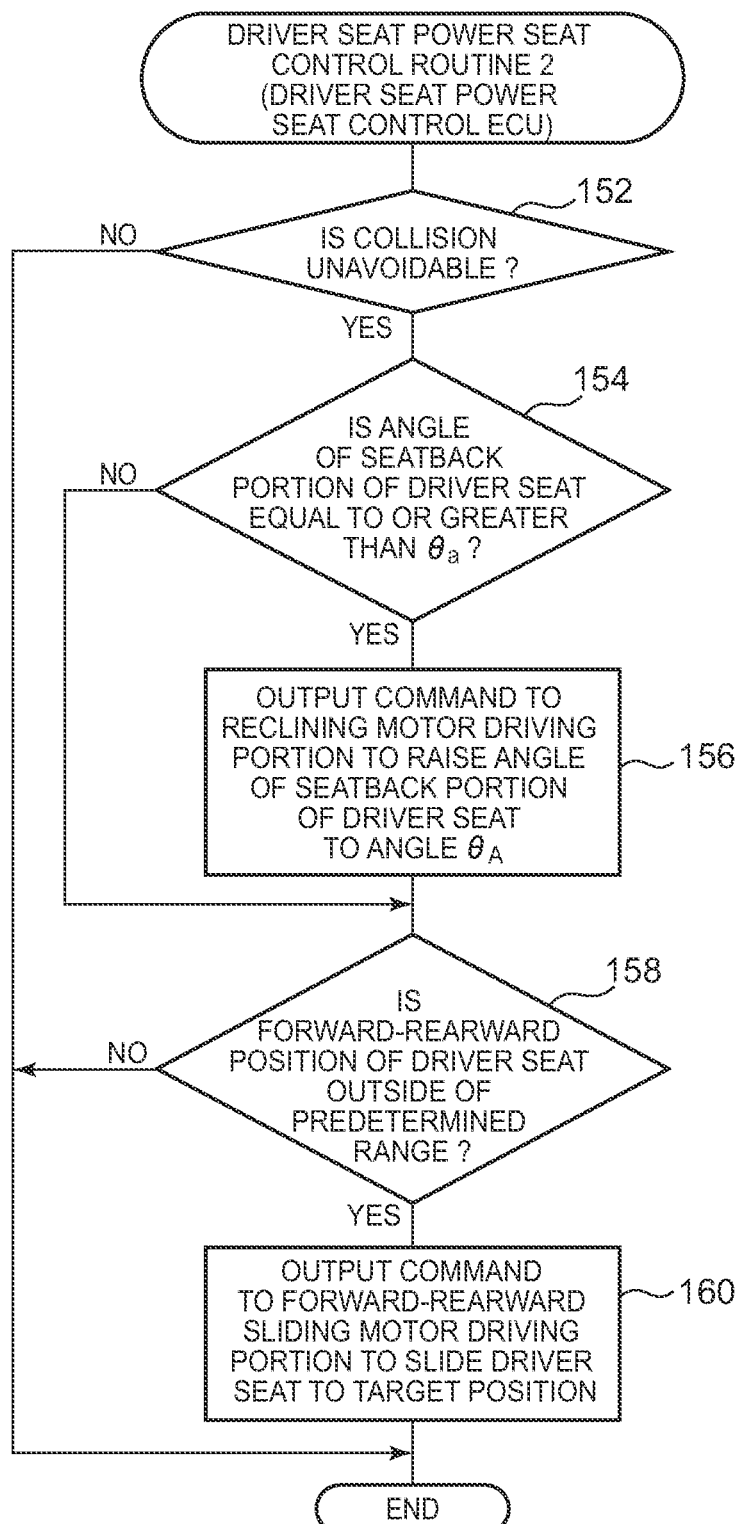
FIG. 8 is a flowchart of a driver seat power seat control routine 2 according to a third example embodiment of the present disclosure.

In the third example embodiment, the ECU 18 performs the driver seat power seat control routine 2 shown in FIG. 8. The driver seat power seat control routine 2 differs from the driver seat power seat control routine 1 (FIG. 4) described in the first example embodiment in that steps 158 and 160 are added. That is, when a vehicle collision is unavoidable (i.e., the determination in step 152 is YES) and the angle of the seatback portion 42 of the driver seat 34 is less than the predetermined angle $\theta_a$ (i.e., the determination in step 154 is NO), or when the angle of the seatback portion 42 of the driver seat 34 is equal to or greater than the predetermined angle $\theta_a$ (i.e., the determination in step 154 is YES) and the seatback portion 42 of the driver seat 34 is pivoted to the target angle $\theta_A$ (step 156), the process proceeds on to step 158.

In step 158, the ECU 18 obtains the vehicle forward-rearward position of the driver seat 34 ascertained by the forward-rearward sliding motor driving portion 30, and determines whether the obtained vehicle forward-rearward position of the driver seat 34 is outside of a predetermined range that has been set beforehand. This predetermined range is set with consideration given to (1) ensuring protection performance with respect to an occupant in the rear seat 84 directly behind the driver seat 34, such that the vehicle forward-rearward position of the deployment region 88 when the airbag 60 of the rear-seat airbag device 48 that is fixed to the driver seat 34 has inflated and deployed is a proper position such as that shown in FIG. 10B, and is set with consideration also given to (2) ensuring protection performance with respect to an occupant in the driver seat 34, and to (3) suppressing an effect on driving by the occupant in the driver seat 34.

Figure 10A:
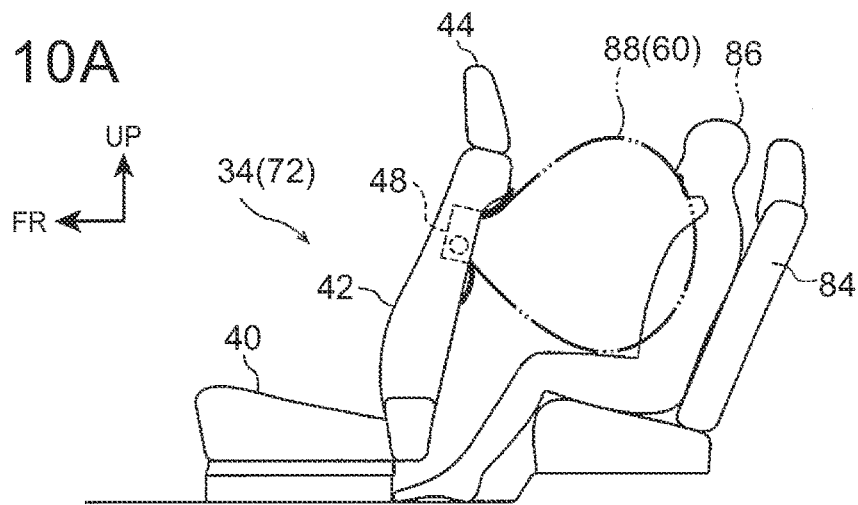
FIG. 10A is a schematic view of a change in the deployment region of the rear-seat airbag following a change in the vehicle front-rear direction of a seat, when a driver seat is not in a proper position.
Figure 10B:
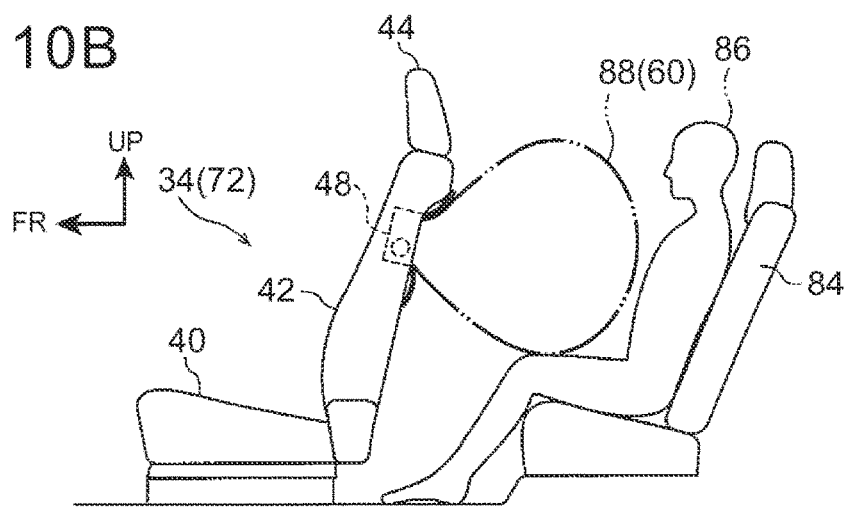
FIG. 10B is a schematic view of a change in the deployment region of the rear-seat airbag following a change in a vehicle front-rear direction of the seat, when the driver seat is in a proper position.
Figure 10C:
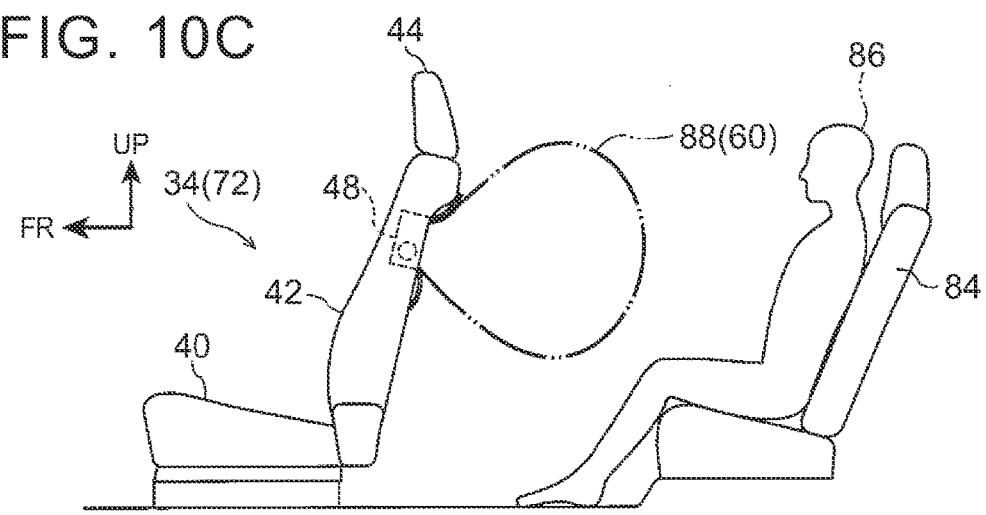
FIG. 10C is a schematic view of a change in the deployment region of the rear-seat airbag following a change in the vehicle front-rear direction of the seat, when the driver seat is not in a proper position.

If the determination in step 158 is YES, it is highly likely that the vehicle forward-rearward position of the deployment region 88 when the airbag 60 of the rear-seat airbag device 48 that is fixed to the driver seat 34 inflates and deploys is off, as shown in FIG. 10A or FIG. 10C, from the proper position shown in FIG. 10B, such that when a vehicle collision occurs, the inflated and deployed airbag 60 may not be able to effectively restrain an occupant seated in the rear seat 84 directly behind the driver seat 34.

Therefore, if the determination in step 158 is YES, the process proceeds on to step 160. In step 160, the ECU 18 outputs a command to the forward-rearward sliding motor driving portion 30 to slide the driver seat 34 forward or rearward with respect to the vehicle, to a target position. The target position is set taking into consideration three conditions: (1) that protection performance with respect to an occupant in the rear seat 84 be ensured, (2) that protection performance with respect to an occupant in the driver seat 34 be ensured, and (3) that an effect on driving by the occupant in the driver seat 34 be suppressed. For example, the target position may be a position within the predetermined range described above, but the target position may also be adjusted according to the current angle of the seatback portion 42 of the driver seat 34. Also, upon receiving the command, the forward-rearward sliding motor driving portion 30 drives the forward-rearward sliding motor 38 such that the vehicle forward-rearward position of the driver seat 34 comes to match the target position.

As a result, the driver seat 34 in the position shown in FIG. 10A or FIG. 10C slides forward or rearward with respect to the vehicle, to the position shown in FIG. 10B or a position near this position, such that the position of the driver seat 34 changes to a position where the airbag 60 that has inflated and deployed at the time of a vehicle collision is able to effectively restrain an occupant in the rear seat 84 directly behind the driver seat 34 (i.e., to a position where the deployment region 88 when the airbag 60 inflates and deploys is in the proper position shown in FIG. 10B).

On the other hand, if the determination in step 158 is NO, it can be determined that the current position of the driver seat 34 is a position where the airbag 60 that has inflated and deployed at the time of a vehicle collision is able to effectively restrain an occupant in the rear seat 84 directly behind the driver seat 34, so this cycle of the routine ends without changing the position of the driver seat 34.

With the driver seat power seat control routine 2 described above, in addition to the effects obtained by the driver seat power seat control routine 1, it is possible to inhibit a decrease in rear-seat occupant restraint performance by the rear-seat airbag device 48, as well as ensure protection performance with respect to an occupant in the driver seat 34, and also inhibit an effect on driving by an occupant in the driver seat 34, according to the vehicle forward-rearward position of the driver seat 34 when a vehicle collision is unavoidable.

Also, in the third example embodiment, the ECU 66 executes a front passenger seat power seat control routine 3 shown in FIG. 9. The front passenger seat power seat control routine 3 differs from the front passenger seat power seat control routine 1 (FIG. 5) described in the first example embodiment in that steps 186 and 188 have been added. That is, after the seatback portion 42 of the front passenger seat 72 has been pivoted as necessary (steps 172 to 184) according to whether there is an occupant in the front passenger seat 72, when the likelihood of a vehicle collision is high (i.e., when the determination in step 171 is YES), the process proceeds on to step 186.

Steps 186 and 188 in the front passenger seat power seat control routine 3 are basically the same as steps 158 and 160 in the driver seat power seat control routine 2 shown in FIG. 8, except that the control target is the front passenger seat 72. However, the predetermined range used in the determination in step 186 and the target position in step 188 are set taking into consideration two conditions: (1) that protection performance with respect to an occupant in the rear seat 84 directly behind the front passenger seat 72 be ensured, and (2) that protection performance with respect to an occupant in the front passenger seat 72 be ensured.

With this front passenger seat power seat control routine 3, in addition to the effects obtained by the front passenger seat power seat control routine 1, it is possible to inhibit a decrease in rear-seat occupant restraint performance by the rear-seat airbag device 48, as well as ensure protection performance with respect to an occupant in the front passenger seat 72, according to the vehicle forward-rearward position of the front passenger seat 72 when a vehicle collision is unavoidable, just like the driver seat power seat control routine 2.

Instead of combining the driver seat power seat control routine 2 described above with the front passenger seat power seat control routine 3 described above, the driver seat power seat control routine 2 may also be combined with any one of the front passenger seat power seat control routines 1 or 2 described in the first and second example embodiments, or front passenger seat power seat control routines 4 to 6 that will be described in fourth to sixth example embodiments below.

Also, instead of combining the front passenger seat power seat control routine 3 described above with the driver seat power seat control routine 2 described above, the front passenger seat power seat control routine 3 may also be combined with any one of the driver seat power seat control routine 1 described in the first example embodiment, the mode in which the ECU 18 does not perform a driver seat power seat control routine described in the second example embodiment, and a driver seat power seat control routine 3 that will be described in the fourth example embodiment.

Fourth Example Embodiment

Next, a fourth example embodiment of the present disclosure will be described. Portions in the fourth example embodiment that are the same as those in the first example embodiment will be denoted by the same reference characters and descriptions thereof will be omitted.

Figure 11:
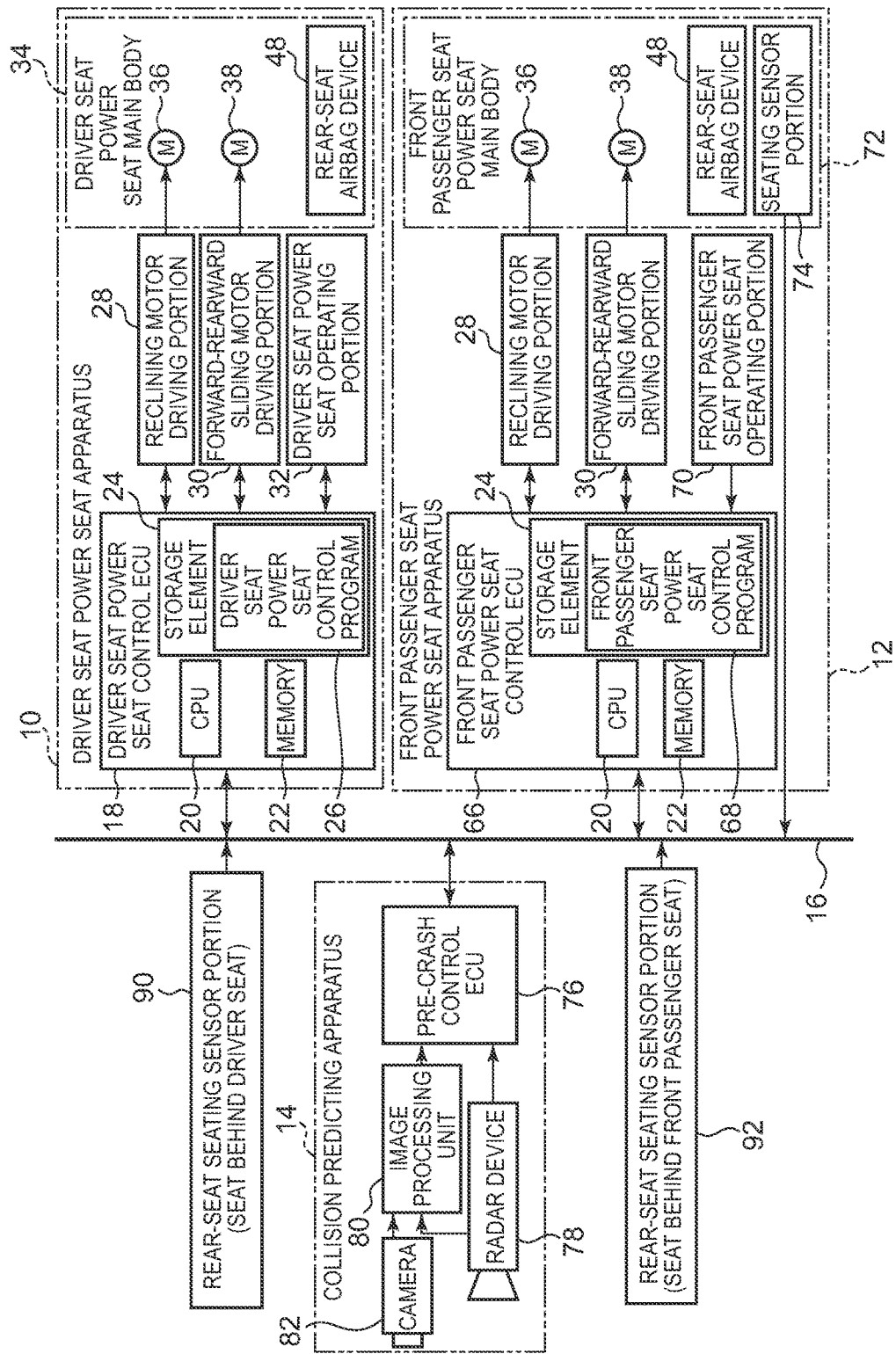
FIG. 11 is a block diagram schematically showing power seat apparatuses and a collision predicting apparatus according to a fourth example embodiment of the present disclosure.

As shown in FIG. 11, the fourth example embodiment differs from the first example embodiment in that rear-seat seating sensor portions 90 and 92 are connected to the bus 16. The rear-seat seating sensor portion 90 includes a seating sensor that is built into a seat cushion portion of the rear seat 84 in a position directly behind the driver seat 34 and detects a change in load that occurs when an occupant is seated, and a detection signal transmitting portion. A detection signal output from the rear-seat seating sensor portion 90 is input to the ECU 18 of the driver seat power seat apparatus 10 via the bus 16.

Also, the rear-seat seating sensor portion 92 includes a seating sensor that is built into a seat cushion portion of the rear seat 84 in a position directly behind the front passenger seat 72 and detects a change in load that occurs when an occupant is seated, and a detection signal transmitting portion. A detection signal output from the rear-seat seating sensor portion 92 is input to the ECU 66 of the front passenger seat power seat apparatus 12 via the bus 16. In the fourth example embodiment, the rear-seat seating sensor portions 90 and 92 are each examples of a second detecting portion.

Figure 12:
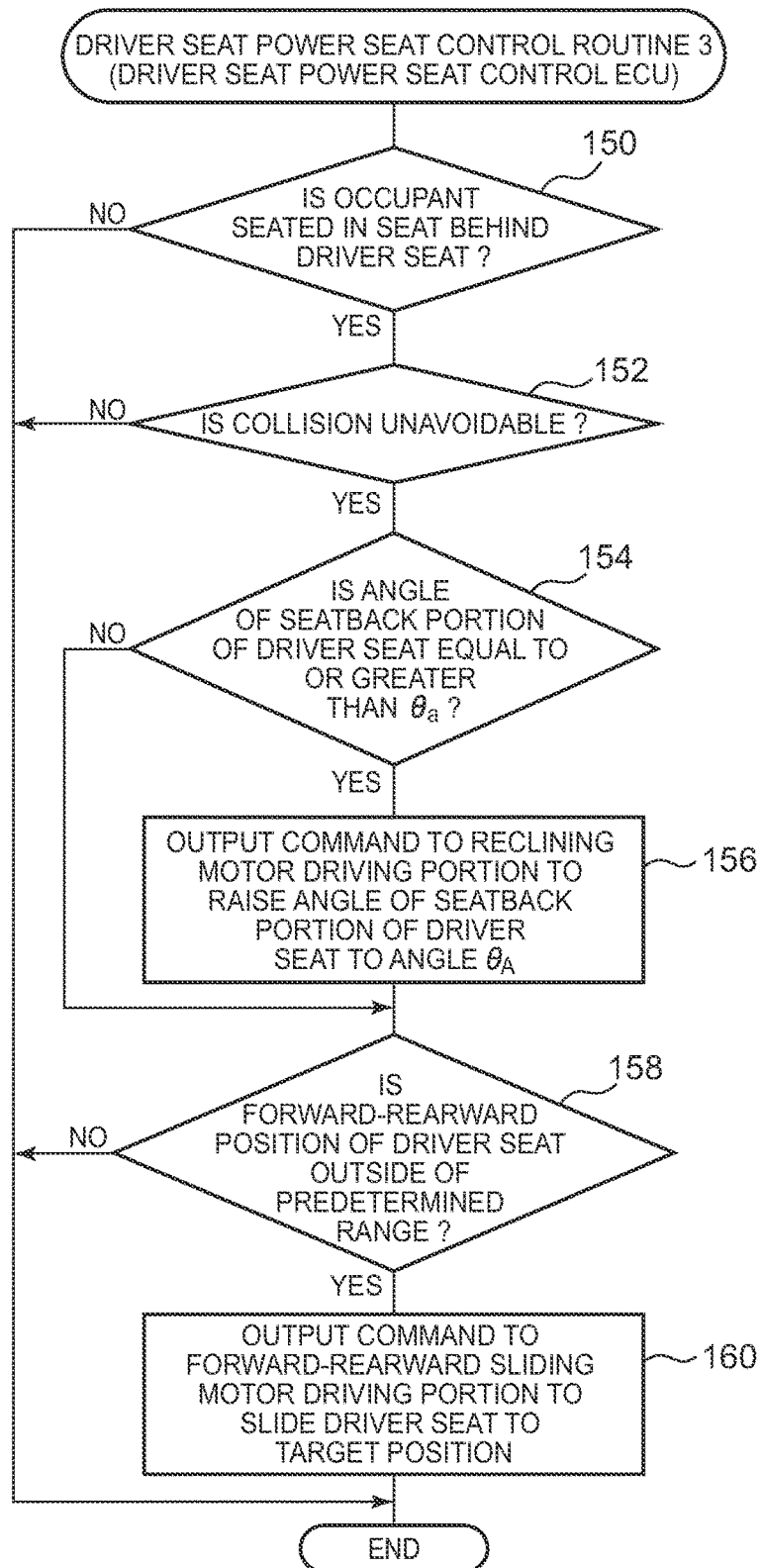
FIG. 12 is a flowchart of a driver seat power seat control routine 3 according to the fourth example embodiment.

Next, the operation of the fourth example embodiment will be described for only those portions that differ from the third example embodiment. In the fourth example embodiment, the ECU 18 performs a driver seat power seat control routine 3 shown in FIG. 12. The driver seat power seat control routine 3 differs from the driver seat power seat control routine 2 (FIG. 8) described in the third example embodiment in that step 150 has been added. In step 150, the ECU 18 determines whether an occupant is seated in the rear seat 84 directly behind the driver seat 34, based on the detection signal from the rear-seat seating sensor portion 90. If the determination in step 150 is YES, the process proceeds on to step 152, and control in steps 152 and thereafter is performed. If the determination in step 150 is NO, this cycle of the routine ends.

With the driver seat power seat control routine 3 described above, in addition to the effects obtained by the driver seat power seat control routine 2, the effect that a change in the position of the driver seat 34 has on an occupant in the driver seat 34 is able to be reduced by restricting a change in the position of the driver seat 34 to only when necessary, which is when an occupant is seated in the rear seat 84 directly behind the driver seat 34.

Figure 13:
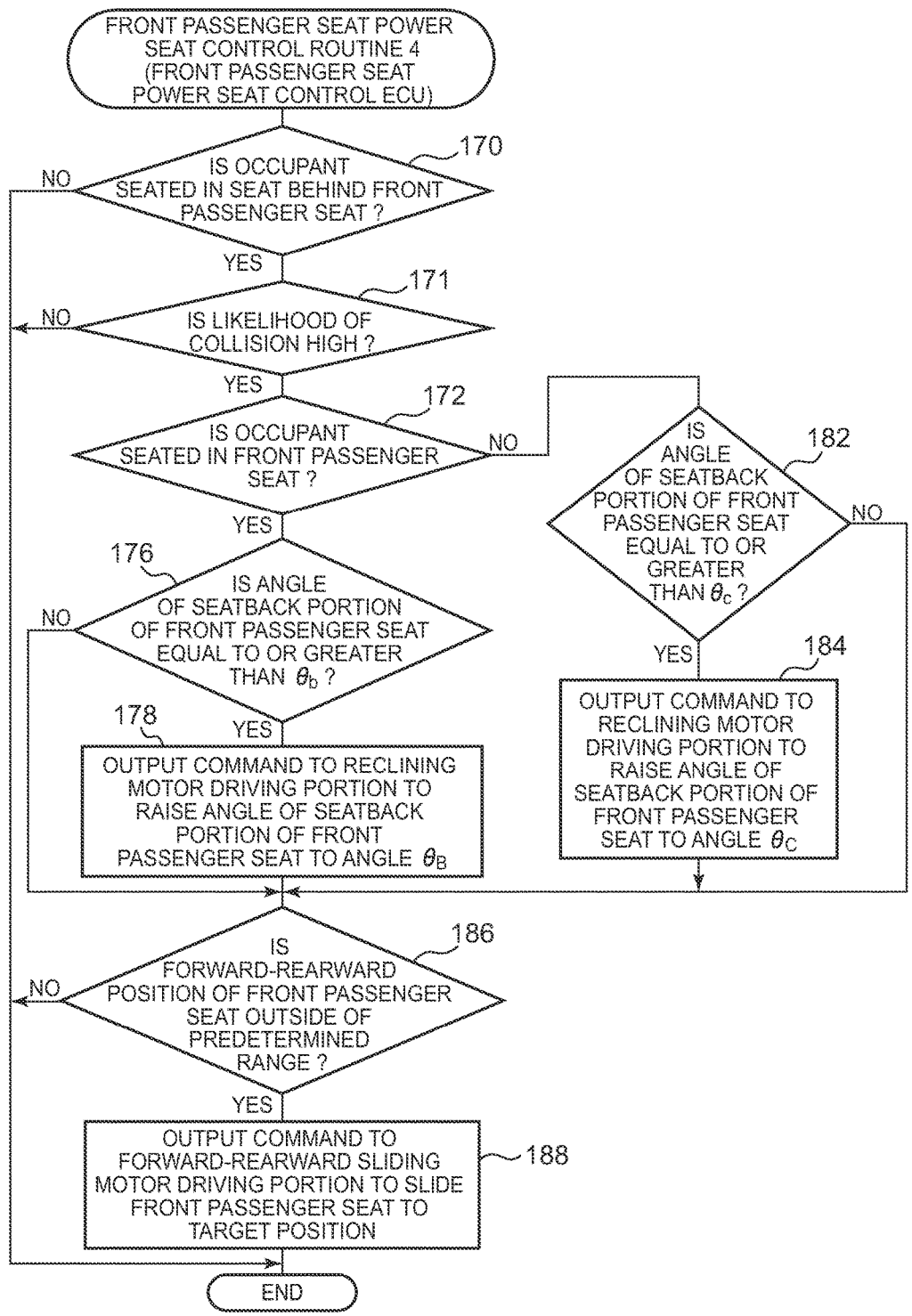
FIG. 13 is a flowchart of a front passenger seat power seat control routine 4 according to the fourth example embodiment.

Also, in the fourth example embodiment, the ECU 66 performs a front passenger seat power seat control routine 4 shown in FIG. 13. The front passenger seat power seat control routine 4 differs from the front passenger seat power seat control routine 3 (FIG. 9) described in the third example embodiment in that step 170 has been added. In step 170, the ECU 66 determines whether an occupant is seated in the rear seat 84 directly behind the front passenger seat 72, based on a detection signal from the rear-seat seating sensor portion 92. If the determination in step 170 is YES, the process proceeds on to step 171, and the control in steps 171 and thereafter is performed. If the determination in step 170 is NO, this cycle of the routine ends.

With the front passenger seat power seat control routine 4 described above, in addition to the effects obtained by the front passenger seat power seat control routine 3, the effect that a change in the position of the front passenger seat 72 has on an occupant in the front passenger seat 72 is able to be reduced by restricting a change in the position of the front passenger seat 72 to only when necessary, which is when an occupant is seated in the rear seat 84 directly behind the front passenger seat 72.

Instead of combining the driver seat power seat control routine 3 described above with the front passenger seat power seat control routine 4 described above, the driver seat power seat control routine 3 may also be combined with any one of the front passenger seat power seat control routines 1 to 3 described in the first to third example embodiments, or front passenger seat power seat control routines 5 and 6 that will be described in the fifth and sixth example embodiments below.

Also, instead of combining the front passenger seat power seat control routine 4 described above with the driver seat power seat control routine 3 described above, the front passenger seat power seat control routine 4 may also be combined with any one of the driver seat power seat control routine 1 described in the first example embodiment, the mode in which the ECU 18 does not perform a driver seat power seat control routine described in the second example embodiment, and the driver seat power seat control routine 2 described in the third example embodiment.

Fifth Example Embodiment

Next, a fifth example embodiment of the present disclosure will be described. Portions in the fifth example embodiment that are the same as those in the fourth example embodiment will be denoted by the same reference characters and descriptions thereof will be omitted.

In each example embodiment up to the fourth example embodiment, a mode is described in which, when a collision is predicted, the collision predicting apparatus 14 outputs a collision warning signal when it is predicted that the collision will occur after the time a has passed, and outputs a collision anticipated signal when it is predicted that the collision will occur after time b (where b<a) has passed. On the other hand, in the fifth example embodiment, the collision predicting apparatus 14 outputs a collision caution signal when it is predicted that a collision will occur after a time c (where c>a>b) has passed, in addition to outputting the collision warning signal and the collision anticipated signal described above. The time c is longer than the times a and b, so the warning caution signal will be output from the collision predicting apparatus 14 at a stage when the collision risk is lower than it is when the collision warning signal is output, i.e., at a stage when the likelihood of a collision is moderate. In the fifth example embodiment, the seating sensor portion 74 is one example of a first detecting portion.

Below, the operation of the fifth example embodiment will be described for only those portions that differ from the fourth example embodiment. In the fifth example embodiment, the ECU 18 may perform any one of the driver seat power seat control routine 1 described in the first example embodiment, the driver seat power seat control routine 2 described in the third example embodiment, and the front passenger seat power seat control routine 3 described in the fourth example embodiment, and does not have to perform a driver seat power seat control routine, as described in the second example embodiment.

Figure 14:
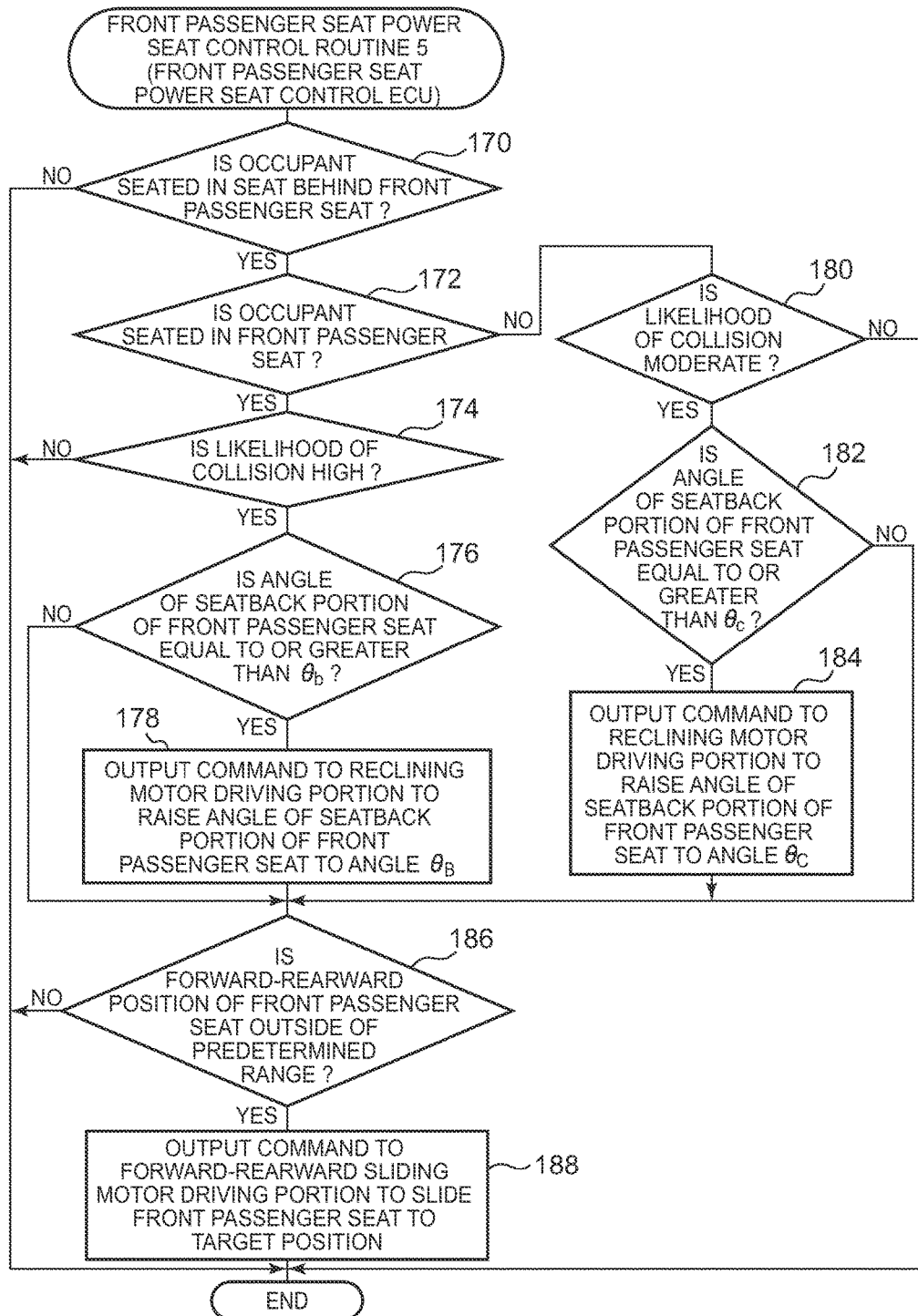
FIG. 14 is a flowchart of a front passenger seat power seat control routine 5 according to a fifth example embodiment of the present disclosure.

Meanwhile, in the fifth example embodiment, the ECU 66 performs a front passenger seat power seat control routine 5 shown in FIG. 14. The front passenger seat power seat control routine 5 differs from the front passenger seat power seat control routine 4 (FIG. 13) described in the fourth example embodiment in that step 171 is omitted and steps 174 and 180 have been added.

In the front passenger seat power seat control routine 5, if an occupant is seated in the rear seat 84 directly behind the front passenger seat 72 such that the determination in step 170 is YES, the process proceeds on to step 172, where it is determined whether an occupant is seated in the front passenger seat 72. If an occupant is seated in the front passenger seat 72, the process proceeds on from step 172 to step 174, and in step 174 the ECU 66 determines whether the likelihood of a vehicle collision is high, based on whether a collision warning signal has been output from the collision predicting apparatus 14. If the determination is YES, the ECU 66 performs control to change the position of the front passenger seat 72 as necessary in steps 176 and steps thereafter. If the determination is NO, this cycle of the routine ends.

Also, if an occupant is not seated in the front passenger seat 72, the process proceeds on from step 172 to step 180. In step 180, the ECU 66 determines whether the likelihood of a vehicle collision is moderate, based on whether a collision caution signal has been output from the collision predicting apparatus 14. If the determination is YES, the ECU 66 performs control to change the position of the front passenger seat 72 as necessary in steps 182 and thereafter. If the determination is NO, this cycle of the routine ends.

In this way, in the front passenger seat power seat control routine 5, the start of control to change the position of the front passenger seat 72 as necessary is different when an occupant is seated in the front passenger seat 72 than it is when an occupant is not seated in the front passenger seat 72. When an occupant is not seated in the front passenger seat 72, the control is started earlier than it is when an occupant is seated in the front passenger seat 72, so the change in the position of the front passenger seat 72 is completed earlier. Therefore, when an occupant is not seated in the front passenger seat 72, an occupant seated in the rear seat 84 directly behind the front passenger seat 72 is able to be more reliably restrained at the time of a vehicle collision.

On the other hand, when an occupant is seated in the front passenger seat 72, the control is started at a timing later than that when an occupant is not seated in the front passenger seat 72, i.e., at a timing when the collision risk is greater. Also, even if a collision caution signal has been output from the collision predicting apparatus 14, if a collision warning signal is no longer output due to the collision being avoided, the control will not be started when an occupant is seated in the front passenger seat 72. As a result, when an occupant is seated in the front passenger seat 72, the effect that a change in the position of the front passenger seat 72 has on the occupant seated in the front passenger seat 72 is able to be reduced by restricting a change in the position of the front passenger seat 72 to only when necessary.

Therefore, with the front passenger seat power seat control routine 5 described above, in addition to the effects obtained by the front passenger seat power seat control routine 4, appropriate control according to whether an occupant is seated in the front passenger seat 72 is able to be performed as control to change the position of the front passenger seat 72 as necessary.

Sixth Example Embodiment

Next, a sixth example embodiment of the present disclosure will be described. Portions in the sixth example embodiment that are the same as those in the fifth example embodiment will be denoted by the same reference characters and descriptions thereof will be omitted.

Figure 15:
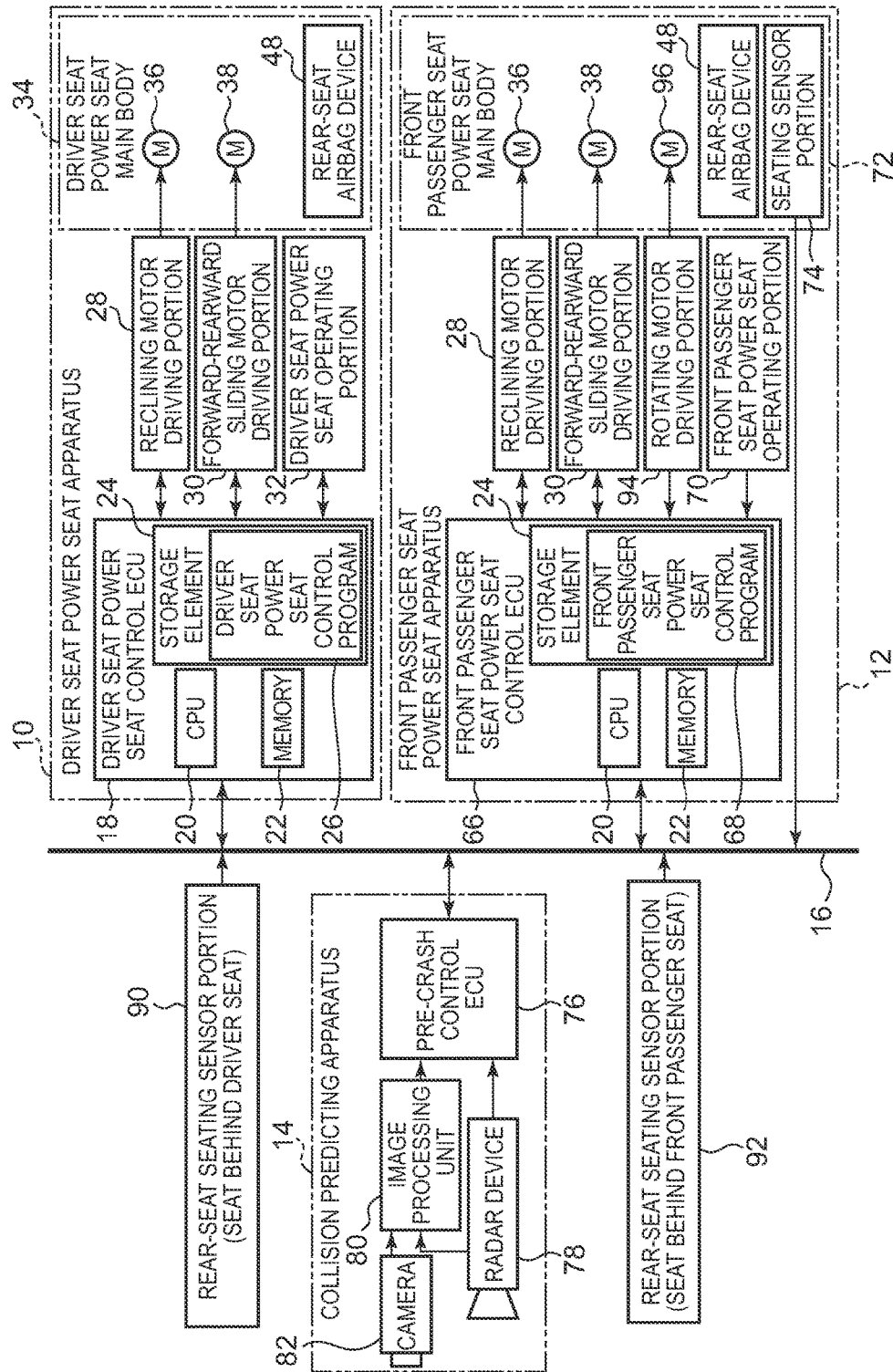
FIG. 15 is a block diagram schematically showing power seat apparatuses and a collision predicting apparatus according to a sixth example embodiment of the present disclosure.

As shown in FIG. 15, in the sixth example embodiment, a rotating motor driving portion 94 is also connected to the ECU 66 of the front passenger seat power seat apparatus 12. This rotating motor driving portion 94 controls the driving of a rotating motor 96 provided in the front passenger seat 72.

Figure 16:
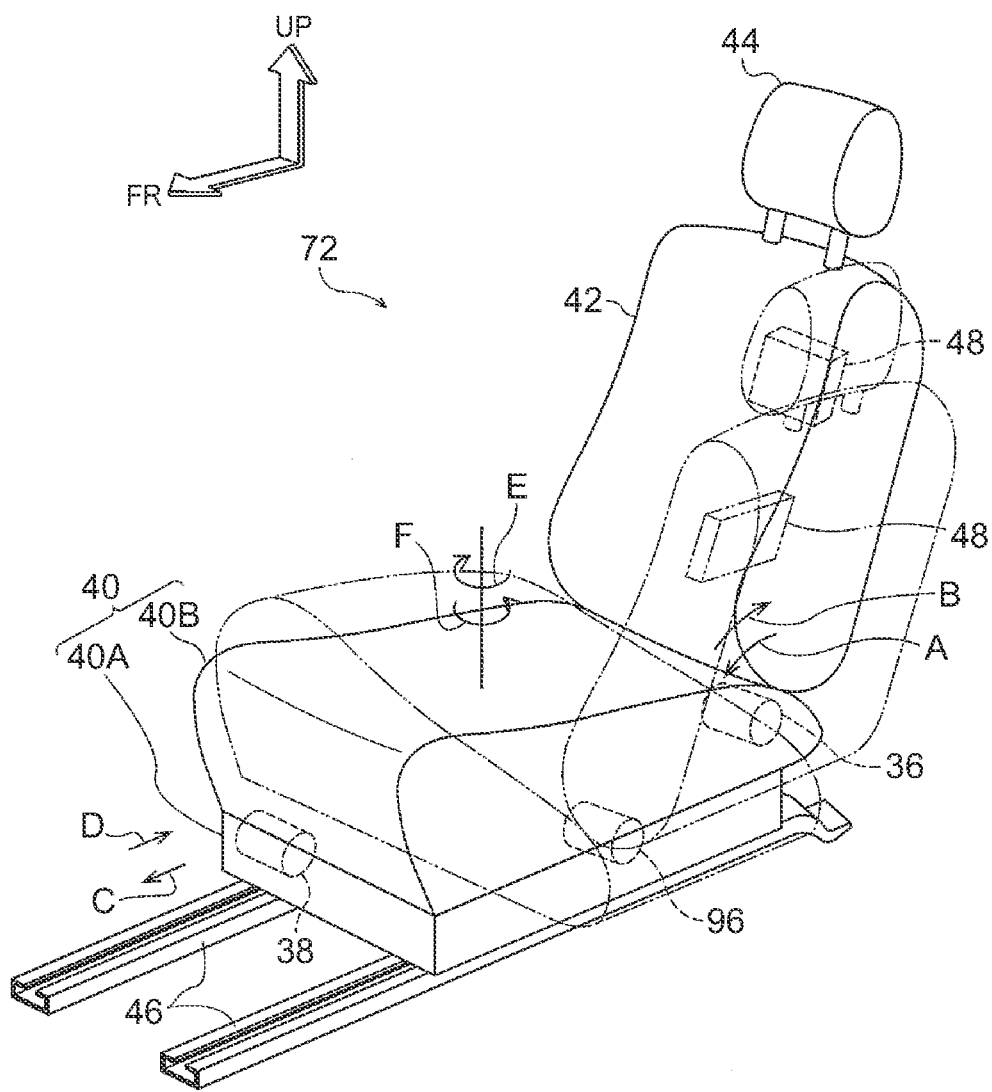
FIG. 16 is a perspective view of a power seat main body according to the sixth example embodiment.

As shown in FIG. 16, the seat cushion portion 40 of the front passenger seat 72 according to this sixth example embodiment is divided into a base portion 40A and a cushion portion 40B. The cushion portion 40B is supported by the base portion 40A via a rotating mechanism, not shown, and is able to rotate with respect to the base portion 40A, around an axis that extends the vehicle up and down direction (i.e., that is able to rotate in the directions of arrows E and F in FIG. 16) (see also the imaginary lines shown in FIG. 16).

The rotating motor 96 is built into the base portion 40A. The rotating motor 96 is configured such that rotary force of a rotating shaft thereof is transmitted to the cushion portion 40B as driving force that rotates the cushion portion 40B (the portion of the front passenger seat 72 other than the seat cushion portion 40) via a reduction mechanism, not shown, around an axis that extends in the vehicle up and down direction. Therefore, the portion of the front passenger seat 72 other than the base portion 40A (hereinafter, this portion will simply be referred to as the "front passenger seat 72") rotates in the direction of arrow E or arrow F in FIG. 16 with respect to the base portion 40A, according to the rotational direction of the rotating shaft of the rotating motor 96 when the rotating motor 96 is driven. The rotating motor driving portion 94 is able to change the orientation of the front passenger seat 72 around the axis that extends in the vehicle up and down direction (hereinafter, simply referred to as the "orientation") by controlling the starting and stopping of the driving of the rotating motor 96 and the rotational direction and rotation speed of the rotating shaft when the rotating motor 96 is driven.

Also, the rotating motor driving portion 94 recognizes the orientation of the front passenger seat 72. The orientation of the front passenger seat 72 may be recognized, for example, by obtaining a signal from a sensor that detects the orientation of the front passenger seat 72 or the rotation amount of the rotating shaft of the rotating motor 96, or, if the rotating motor 96 is a pulse motor, by counting a pulse number of a pulse signal output to the rotating motor 96. Also, when a target position (target orientation) of the front passenger seat 72 is input from the ECU 18, the rotating motor driving portion 94 controls the driving of the rotating motor 96 such that the recognized orientation of the front passenger seat 72 comes to match the input target orientation.

Below, the operation of the sixth example embodiment will be described for only those portions that differ from the fifth example embodiment. In the sixth example embodiment, the ECU 18 may perform any one of the driver seat power seat control routine 1 described in the first example embodiment, the driver seat power seat control routine 2 described in the third example embodiment, and the front passenger seat power seat control routine 3 described in the fourth example embodiment, and does not have to perform a driver seat power seat control routine, as described in the second example embodiment.

Meanwhile, in the sixth example embodiment, the ECU 66 performs a front passenger seat power seat control routine 6 shown in FIG. 17. The front passenger seat power seat control routine 6 differs from the front passenger seat power seat control routine 5 (FIG. 14) described in the fifth example embodiment in that steps 190 and 192 have been added. In the front passenger seat power seat control routine 6, when the determination in step 186 is NO or once step 188 is performed, the process proceeds on to step 190.

In step 190, the ECU 18 obtains the orientation of the front passenger seat 72 ascertained by the rotating motor driving portion 94, and determines whether the obtained orientation of the front passenger seat 72 is outside of a predetermined range that has been set beforehand. This predetermined range is set such that the orientation of the deployment region 88 when the airbag 60 of the rear-seat airbag device 48 that is fixed to the front passenger seat 72 inflates and deploys (i.e., the position of the deployment region 88 around the axis that extends the vehicle up and down direction) becomes a proper orientation such as that shown in FIG. 18B, taking into consideration two conditions: (1) that protection performance with respect to an occupant in the rear seat 84 directly behind the front passenger seat 72 be ensured, and (2) that protection performance with respect to an occupant in the front passenger seat 72 be ensured.

Figure 18A:
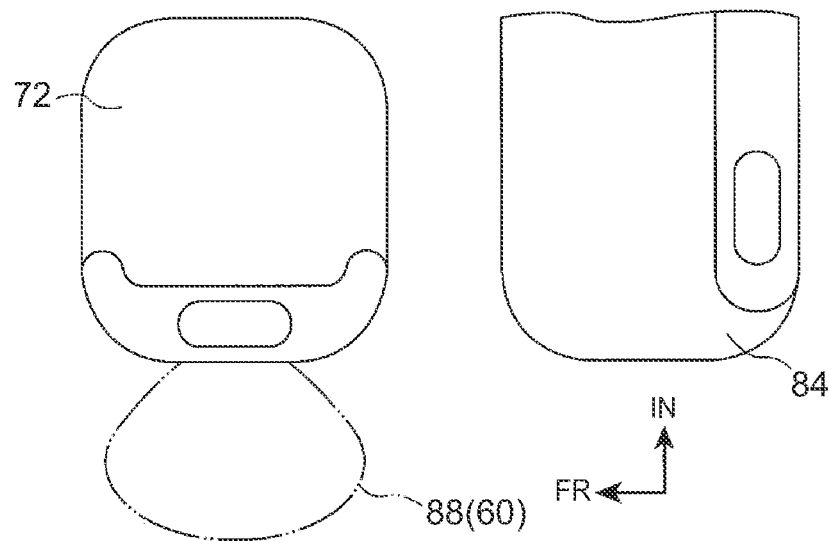
FIG. 18A is a schematic view of a change in the deployment region of the rear-seat airbag following a change in a position around an axis that extends in a vehicle up and down direction of the seat, when the deployment region is not in the proper orientation.
Figure 18B:
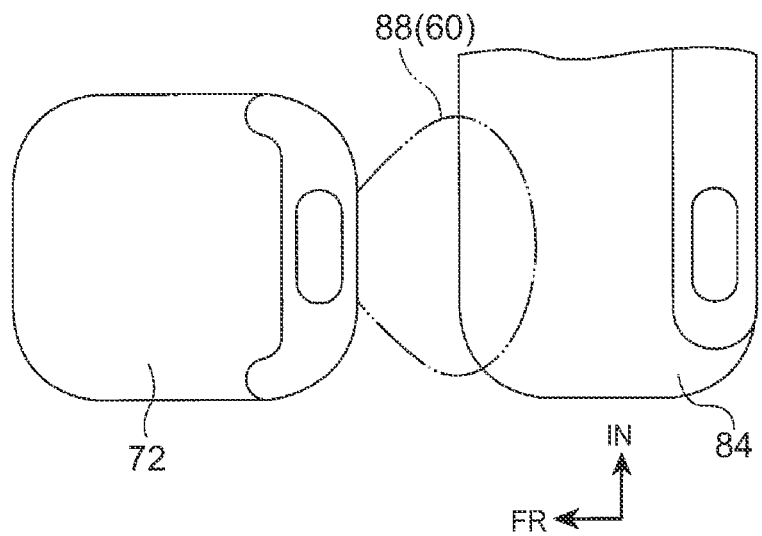
FIG. 18B is a schematic view of a change in the deployment region of the rear-seat airbag following a change in the position around the axis that extends in the vehicle up and down direction of the seat, when the deployment region is appropriate.
Figure 19:
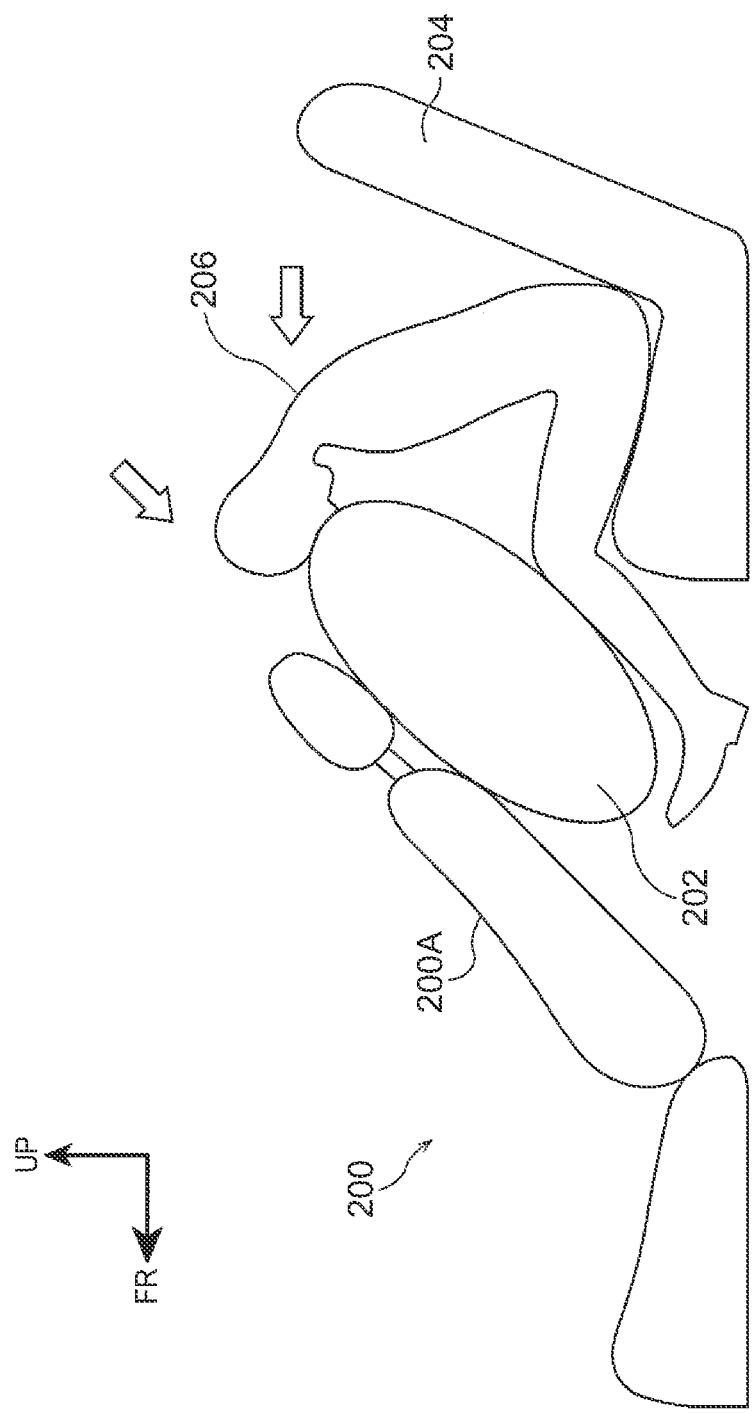
FIG. 19 is a view schematically illustrating a related art.

If the determination in step 190 is YES, it is highly likely that the orientation of the deployment region 88 when the airbag 60 of the rear-seat airbag device 48 that is fixed to the front passenger seat 72 inflates and deploys will be off, as shown in FIG. 18A, from the proper orientation shown in FIG. 18B, such that when a vehicle collision occurs, the inflated and deployed airbag 60 may not be able to effectively restrain an occupant seated in the rear seat 84 directly behind the front passenger seat 72.

Therefore, if the determination in step 190 is YES, the process proceeds on to step 192. In step 192, the ECU 18 outputs a command to the rotating motor driving portion 94 to rotate the front passenger seat 72 to a target orientation. The target orientation is set taking into consideration two conditions: (1) that protection performance with respect to an occupant in the rear seat 84 be ensured, and (2) that protection performance with respect to an occupant in the front passenger seat 72 be ensured. For example, the target orientation may be a position within the predetermined range described above. Also, upon receiving the command, the rotating motor driving portion 94 drives the rotating motor 96 until the front passenger seat 72 is in the target orientation.

As a result, the front passenger seat 72 that had been in the position shown in FIG. 18A, for example, rotates to the orientation shown in FIG. 18B or an orientation close to this orientation, such that the position of the front passenger seat 72 changes to a position where the airbag 60 that has inflated and deployed at the time of a vehicle collision is able to effectively restrain an occupant in the rear seat 84 directly behind the front passenger seat 72 (to a position where the deployment region 88 when the airbag 60 inflates and deploys is in the proper orientation shown in FIG. 18B).

On the other hand, if the determination in step 192 is NO, it can be determined that the current position of the front passenger seat 72 is a position where the airbag 60 that has inflated and deployed at the time of a vehicle collision is able to effectively restrain the occupant in the rear seat 84 directly behind the front passenger seat 72, so this cycle of the routine ends without changing the position of the front passenger seat 72.

With the front passenger seat power seat control routine 6 described above, in addition to the effects obtained by the front passenger seat power seat control routine 5, it is possible to inhibit a decrease in rear-seat occupant restraint performance by the rear-seat airbag device 48, and also ensure protection performance with respect to an occupant in the front passenger seat 72, according to the orientation of the front passenger seat 72 when a vehicle collision is unavoidable.

In the description above, a mode that makes the collision risk when starting control to change the position of the seat as necessary different for the driver seat 34 than it is with the front passenger seat 72 is described, i.e., a mode that starts the control for the driver seat 34 when a collision anticipated signal has been output, and starts the control for the front passenger seat 72 when a collision warning signal (or collision caution signal) is output, is described, but the present disclosure is not limited to this. The collision risk when starting the control may also be the same for both the driver seat 34 and the front passenger seat 72.

Also, although the changing speed (the rotation speeds of the rotating shafts of the motors 36, 38, and 96, and the like) when changing the position of the driver seat 34 or the front passenger seat 72 was not particularly described above, the position changing speed may be different for the driver seat 34 than it is for the front passenger seat 72, for example. Also, the position changing speed may be changed according to the vehicle speed, or the position changing speed may be changed according to a change in the collision risk or the like, for example, while the position is being changed.

Further, the seating sensor portion 74 is described as one example of the first detecting portion, and the rear-seat seating sensor portions 90 and 92 are described as one example of the second detecting portion. However, detection of an occupant is not limited to a method that uses a change in load that occurs when an occupant is seated. That is, an occupant may also be detected by another well-known detection method.

Moreover, the example embodiment above describes a mode in which control to switch routines according to whether there is an occupant is applied to the front passenger seat 72, but the present disclosure is not limited to this. For example, if a vehicle equipped with an automated driving function is put into production, it is possible that there may not be an occupant in the driver seat 34, so control to switch routines according to whether there is an occupant may conceivably also be applied to the driver seat 34. Such a mode is also included within the scope of the present disclosure.

Also, the example embodiment above describes a mode in which the position of the driver seat 34 or the front passenger seat 72 is changed by the driving force of the motors 36, 38, and 96, but the present disclosure is not limited to this. That is, the position of a seat may also be changed using a mechanism (such as a seat walk-in mechanism or similar mechanism) that changes the position of the seat by the elastic force of a spring or the like.

Also, the example embodiment described above describes a mode in which the present disclosure is applied to a first row of seats in a vehicle provided with two rows of seats, but the present disclosure is not limited to this. The present disclosure may also be applied to a seat that is in a second or subsequent row aside from the last row, in a vehicle provided with three or more rows of seats.

Moreover, the example embodiment described above describes a mode in which the position of the seat changes when the position of the seat at the time a collision is predicted is outside of a predetermined range (for example, when the angle of the seatback portion 42 is equal to or greater than the predetermined angle $\theta_a$, or equal to or greater than the predetermined angle $\theta_b$, or equal to or greater than the predetermined angle $\theta_c$). However, the present disclosure is not limited to this. The position of the seat may also be changed regardless of the position of the seat at the time a collision is predicted. For example, regarding the angle of the seatback portion of the seat, the ideal angle when top priority is given to protecting a rear-seat occupant is 0° (in which the seatback portion is parallel to the vehicle up and down direction) or an angle close thereto, but this angle is outside of a suitable angle range for a seated occupant, so the likelihood that the seatback portion will be at this ideal angle at the time a collision is predicted is extremely low. Therefore, when a collision is predicted, control to change the angle of the seatback portion to this ideal angle or an angle close thereto may be performed regardless of the position of the seat when a collision is predicted. Such a mode is also included in the scope of the present disclosure.

Japanese Patent Application Publication No. 2015-087192 (JP 2015-087192 A) describes technology that arranges an airbag that inflates and deploys within a seatback of a seat (a front seat) at the time of a rear-end collision, in a stored state in the seatback, and displaces the seatback to within a predetermined range by driving a motor, when an inclination angle of the seatback is outside of the predetermined range, when a rear-end collision with an impact load equal to or greater than a predetermined value is predicted. However, this technology is designed to protect an occupant in a front seat at the time of a rear-end collision. The example embodiment of this specification differs from this related art in that i) the occupant to be protected is an occupant in a rear seat, ii) the airbag deploys between the seatback portion and an occupant seating space of the rear seat, and iii) the direction of impact for which protection is provided is different. It should therefore be noted that the example embodiment of this specification is not something that was able to be easily invented based on the related art.

What is claimed is:

1. A vehicle seat comprising:
a driving portion that changes a position of a seat;
a rear-seat airbag that is fixed to the seat and deploys between a seatback portion of the seat and an occupant seating space of a rear seat behind the seat;
a control portion configured to change a position of the seat with the driving portion and adjust a deployment region of the rear-seat airbag, when a collision of a vehicle is predicted; and
a first detecting portion that detects an occupant seated in the seat,
wherein the control portion is configured to start changing the position of the seat with the driving portion earlier when an occupant is not detected by the first detecting portion than when an occupant is detected by the first detecting portion.

2. The vehicle seat according to claim 1, wherein
the driving portion is configured to change an inclination angle of the seatback portion;
the rear-seat airbag is fixed to the seatback portion; and
the control portion is configured to change the inclination angle of the seatback portion to a predetermined angle with the driving portion when the collision of the vehicle is predicted.

3. The vehicle seat according to claim 1, wherein
the driving portion is configured to change a vehicle forward-rearward position of the seat; and
the control portion is configured to change the vehicle forward-rearward position of the seat to a predetermined position with the driving portion when the collision of the vehicle is predicted.

4. The vehicle seat according to claim 1, wherein
the driving portion is configured to rotate the seat around an axis that extends in a vehicle up and down direction; and
the control portion is configured to rotate the seat with the driving portion to a predetermined position around the axis that extends in the vehicle up and down direction.

5. The vehicle seat according to claim 1, further comprising:
a second detecting portion that detects an occupant seated in the rear seat behind the seat,
wherein the control portion is configured to stop control that changes the position of the seat with the driving portion, when an occupant is not detected by the second detecting portion.

6. The vehicle seat according to claim 1, wherein the driving portion is at least one of a reclining motor that changes an inclination angle of the seatback portion and a forward-rearward sliding motor that changes a vehicle forward-rearward position of the seat.

7. The vehicle seat according to claim 1, further comprising a collision predicting apparatus that predicts the collision of a vehicle, the collision predicting apparatus including at least one of a camera and a radar device.

* * * * *